(12) United States Patent
Blandizzi et al.

(10) Patent No.: US 12,703,354 B2
(45) Date of Patent: Aug. 11, 2026

(54) SYSTEMS AND METHODS FOR SCENE UNDERSTANDING

(71) Applicant: FORD GLOBAL TECHNOLOGIES, LLC, Dearborn, MI (US)

(72) Inventors: Pietro Blandizzi, Munich (DE); Lorenzo Nardi, Munich (DE); Ferenc Török, Munich (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 616 days.

(21) Appl. No.: 17/932,795

(22) Filed: Sep. 16, 2022

(65) Prior Publication Data

US 2024/0101106 A1 Mar. 28, 2024

(51) Int. Cl.
*B60W 30/095* (2012.01)

(52) U.S. Cl.
CPC ..... *B60W 30/0956* (2013.01); *B60W 2552/30* (2020.02); *B60W 2554/4026* (2020.02); *B60W 2554/4029* (2020.02); *B60W 2554/4041* (2020.02); *B60W 2554/4045* (2020.02)

(58) Field of Classification Search
CPC ..... B60W 30/0956; B60W 2554/4041; B60W 2554/4026; B60W 2554/4029; B60W 2552/30; B60W 2554/4045
See application file for complete search history.

(56) References Cited

U.S. PATENT DOCUMENTS

| | | | | |
|---|---|---|---|---|
| 2019/0100200 | A1* | 4/2019 | McNew | G06V 20/588 |
| 2020/0110416 | A1* | 4/2020 | Hong | G05D 1/0221 |
| 2021/0241007 | A1* | 8/2021 | Doria | G01S 17/89 |
| 2022/0371614 | A1* | 11/2022 | Gyllenhammar | G06F 18/217 |
| 2023/0012853 | A1* | 1/2023 | Tam | B60W 30/09 |
| 2023/0166759 | A1* | 6/2023 | Yasuda | H04W 4/46 701/23 |

* cited by examiner

*Primary Examiner* — Toya Pettiegrew
(74) *Attorney, Agent, or Firm* — BROOKS KUSHMAN P.C.

(57) ABSTRACT

This document discloses system, method, and computer program product embodiments for generating a possible object trajectory. For example, the method includes: analyzing sensor data to detect a moving object in an environment and at least one obstacle that the moving object is unable to traverse; generating a definition for a location of the obstacle in the environment in terms of reference frames defined for a lane and distances from a left boundary of the lane to edges of the obstacle; using the definition for the location of the obstacle and known dimensions of the moving object to detect any free space around the obstacle through which the moving object can traverse; and generating the possible object trajectory based on the detection of any free space.

20 Claims, 26 Drawing Sheets

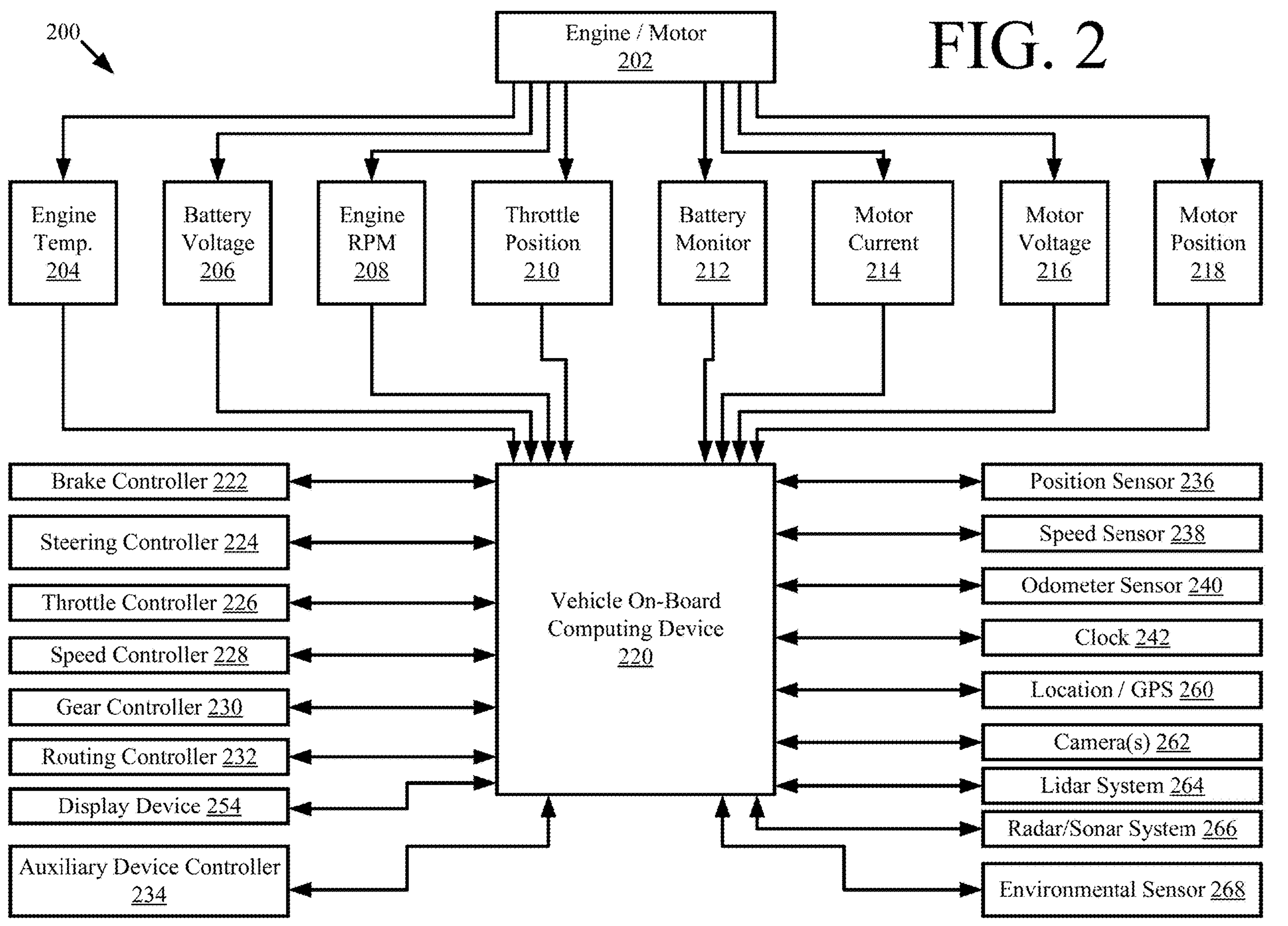
FIG. 2
200
Engine / Motor 202
Engine Temp. 204
Battery Voltage 206
Engine RPM 208
Throttle Position 210
Battery Monitor 212
Motor Current 214
Motor Voltage 216
Motor Position 218
Vehicle On-Board Computing Device 220
Brake Controller 222
Steering Controller 224
Throttle Controller 226
Speed Controller 228
Gear Controller 230
Routing Controller 232
Display Device 254
Auxiliary Device Controller 234
Position Sensor 236
Speed Sensor 238
Odometer Sensor 240
Clock 242
Location / GPS 260
Camera(s) 262
Lidar System 264
Radar/Sonar System 266
Environmental Sensor 268

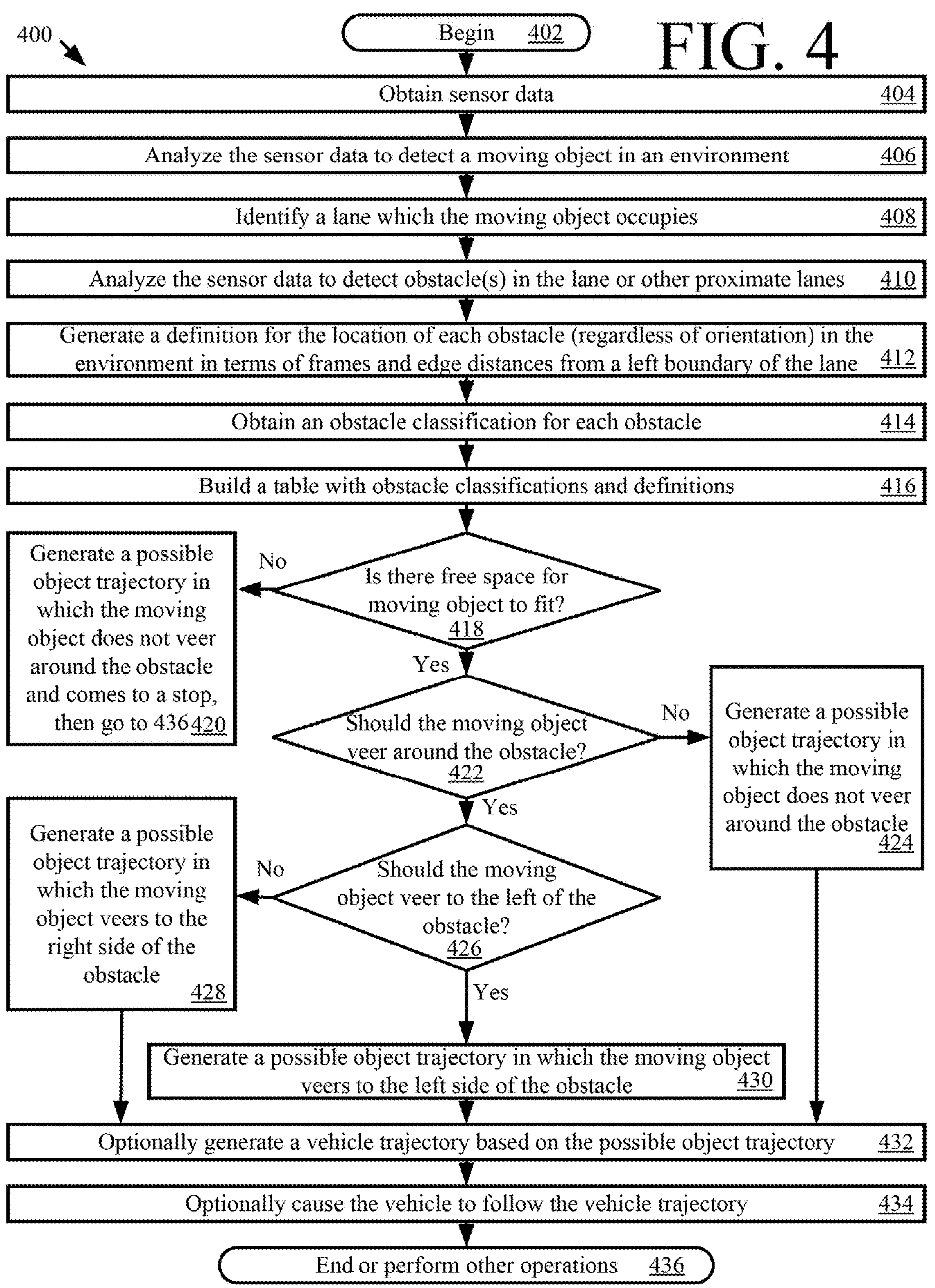
FIG. 4
400
Begin 402
Obtain sensor data 404
Analyze the sensor data to detect a moving object in an environment 406
Identify a lane which the moving object occupies 408
Analyze the sensor data to detect obstacle(s) in the lane or other proximate lanes 410
Generate a definition for the location of each obstacle (regardless of orientation) in the environment in terms of frames and edge distances from a left boundary of the lane 412
Obtain an obstacle classification for each obstacle 414
Build a table with obstacle classifications and definitions 416
Is there free space for moving object to fit? 418
No
Generate a possible object trajectory in which the moving object does not veer around the obstacle and comes to a stop, then go to 436 420
Yes
Should the moving object veer around the obstacle? 422
No
Generate a possible object trajectory in which the moving object does not veer around the obstacle 424
Yes
Should the moving object veer to the left of the obstacle? 426
No
Generate a possible object trajectory in which the moving object veers to the right side of the obstacle 428
Yes
Generate a possible object trajectory in which the moving object veers to the left side of the obstacle 430
Optionally generate a vehicle trajectory based on the possible object trajectory 432
Optionally cause the vehicle to follow the vehicle trajectory 434
End or perform other operations 436

Distance
D514: 6[-4,1], 7[-4,1], 8[-4,1], 9[-4,1] or
6-9[$d_{p1}$=-4, $d_{p4}$=-4, $d_{p5}$=1, $d_{p8}$=1]
Obstacle 514
p1 p2 p3 p4 p5 p6 p7 p8
Left Boundary 502
Lane 500
Lane Direction 506
Obstacle 512
p1 p2 p3 p4 p5 p6 p7 p8 p9 p10
Right Boundary 504
Frame
D512: 0[$d_{p1}$=11, $d_{p10}$=16], 1[$d_{p2}$=11, $d_{p9}$=16], 2[$d_{p3}$=11, $d_{p8}$=16], 3[$d_{p4}$=11, $d_{p7}$=16], 4[$d_{p5}$=11, $d_{p6}$=16] or
frames[corner point distances in clockwise order] = 0-4[$d_{p1}$, $d_{p5}$, $d_{p6}$, $d_{p10}$] = 0-4[11,11,16,16]

Distance
Left Boundary
Lane 700
Lane Direction
Right Boundary
Frame
Obstacle 706
p1 p2 p3 p4
p8 p7 p6 p5
0
1
2
3
12
13
14
15
16
17
18
19
20
21
22
23
24
0 1 2 3 4 5 6 7 8 9 10 11 12 14 15 16
$D_{706}$: 4[12,22], 5[12,22], 6[12,22], 7[12,22] or 4-7[12,12,22,22]

Distance
6[p5,p6] = 6[-2,1]
p5
p6
1108
Lane 1100
Frame
-3
-2
-1
0
1
2
3
4
5
6
7
8
9
10
11
0
1
2
3
4
5
6
7
8
9
10

Distance
7[p7,p8] = 7[0,-3]
p7
p8
1108
Lane 1100
Frame
-4
-3
-2
-1
0
1
2
3
4
4
5
7
8
9
10
0
1
2
3
4
5
6
7
8
9
10

| Obstacle Classification | Lane | Definition |
| --- | --- | --- |
| Parked | L1 | 0[11,16], 1[11,16], 2[11,16], 3[11,16], 4[11,16] |
| Parked | L1 | 6[-4,1], 7[-4,1], 8[-4,1], 9[-4,1] |
| Yeilding | L2 | 4[12,22], 5[12,22], 6[12,22], 7[12,22] |
| Lane Blocking | L3 | 0[10,15], 1[10,15], 2[10,15] |
| Lane Blocking | L4 | 5[10,15], 6[10,15], 7[10,15] |
| Construction | L5 | 4[7,10], 5[7,10], 6[7,10], 7[7,10] |
| Construction | L6 | 3[1,4], 4[1,4], 5[0,3], 6[-2,1], 7[0,-3] |
| Parked | L7 | 0[11, 16], 1[11, 16], 2[11,16], 3[11,16], 4[11,16] |
| Parked | L7 | 1[-1,3], 2[-1,3], 3[-1,3], 4[-1,3] |
| Construction | L7 | 6[-4, 1], 7[-4, 1], 8[-4,1], 9[-4,1] |
| Queued | ⋮ | ⋮ |

| Obstacle Classification | Lane | Frame Interval | Distance Interval [***clockwise corner distances***] |
|---|---|---|---|
| Parked | L1 | 0-4 | [11,11,16,16] |
| Parked | L1 | 6-9 | [-4,-4,1,1] |
| Yeilding | L2 | 4-7 | [12,12,22,22] |
| Lane Blocking | L3 | 0-2 | [10,10,15,15] |
| Lane Blocking | L4 | 5-7 | [10,10,15,15] |
| Construction | L5 | 4-7 | [7,7,10,10] |
| Construction | L6 | 3-7 | [1,0,-3,4] |
| Parked | L7 | 0-4 | [11,11,16,16] |
| Parked | L7 | 1-4 | [-1,-1,3,3] |
| Construction | L7 | 6-9 | [-4,-4,1,1] |
| Queued | | | |

| Obstacle Classification | Lane | Frame Interval | Distance Interval [$d_{min}$, $d_{max}$] |
| --- | --- | --- | --- |
| Parked | L1 | 0-4 | [11,16] |
| Parked | L1 | 6-9 | [-4,1] |
| Yeilding | L2 | 4-7 | [12,22] |
| Lane Blocking | L3 | 0-2 | [10,15] |
| Lane Blocking | L4 | 5-7 | [10,15] |
| Construction | L5 | 4-7 | [7,7,10,10] |
| Construction | L6 | 3-7 | [-2,4] |
| Parked | L7 | 0-4 | [11, 16] |
| Parked | L7 | 1-4 | [-1,3] |
| Construction | L7 | 6-9 | [-4, 1] |
| Queued | | | |

SYSTEMS AND METHODS FOR SCENE UNDERSTANDING

BACKGROUND

As an autonomous vehicle (AV) approaches a dynamic object (such as a mover), the AV uses a predicted trajectory of the dynamic object to modify its own trajectory. Static obstacles should be detected for the dynamic object and used to predict trajectories for the dynamic object. For example, one or more possible trajectories may cause the dynamic object to avoid or otherwise veer around the detected obstacles. The AV comprises a plurality of sensors and algorithms to facilitate object detection, scene understanding, object trajectory prediction and vehicle trajectory generation. The scene understanding of conventional AVs is quite rudimental which limits the capabilities of object trajectory prediction and vehicle trajectory generation.

SUMMARY

The present disclosure concerns implementing systems and methods for generating a possible object trajectory and/or operating a vehicle. The methods comprise: analyzing, by a processor, sensor data to detect a moving object in an environment and at least one obstacle that the moving object is unable to traverse; generating, by the processor, a definition for a location of the obstacle in the environment in terms of reference frames defined for a lane and edge distances from a boundary (e.g., a left boundary) of the lane; using, by the processor, the definition to detect when the moving object should or should not veer around the obstacle; and generating, by the processor, the possible object trajectory based on a detection of when the object should or should not veer around the obstacle.

The present disclosure also comprises implementing systems and methods for generating a possible object trajectory. The methods comprise: analyzing, by a processor, sensor data to detect a moving object in an environment and at least one obstacle that the moving object is unable to traverse; generating, by the processor, a definition for a location of the obstacle in the environment in terms of reference frames defined for a lane and distances from a boundary (e.g., left boundary) of the lane to edges of the obstacle; using, by the processor, the definition for the location of the obstacle and known dimensions of the moving object to detect any free space around the obstacle through which the moving object can traverse; and generating, by the processor, the possible object trajectory based on the detection of any free space.

The implementing systems can comprise: a processor; and a non-transitory computer-readable storage medium comprising programming instructions that are configured to cause the processor to implement a method for generating possible object trajectories and/or operating a vehicle. The above-described methods can also be implemented by a computer program product comprising memory and programming instructions that are configured to cause a processor to perform operations.

BRIEF DESCRIPTION OF THE DRAWINGS

The accompanying drawings are incorporated into this document and form a part of the specification.

FIG. 2 illustrates an example architecture for a vehicle, in accordance with aspects of the disclosure.

FIG. 4 illustrates a method for generating possible object trajectories and/or operating a vehicle.

FIGS. 15-17 each illustrate a table in which object classifications and definition are indexed by lanes.

In the drawings, like reference numbers generally indicate identical or similar elements. Additionally, generally, the left-most digit(s) of a reference number identifies the drawing in which the reference number first appears.

DETAILED DESCRIPTION

Figure 1:
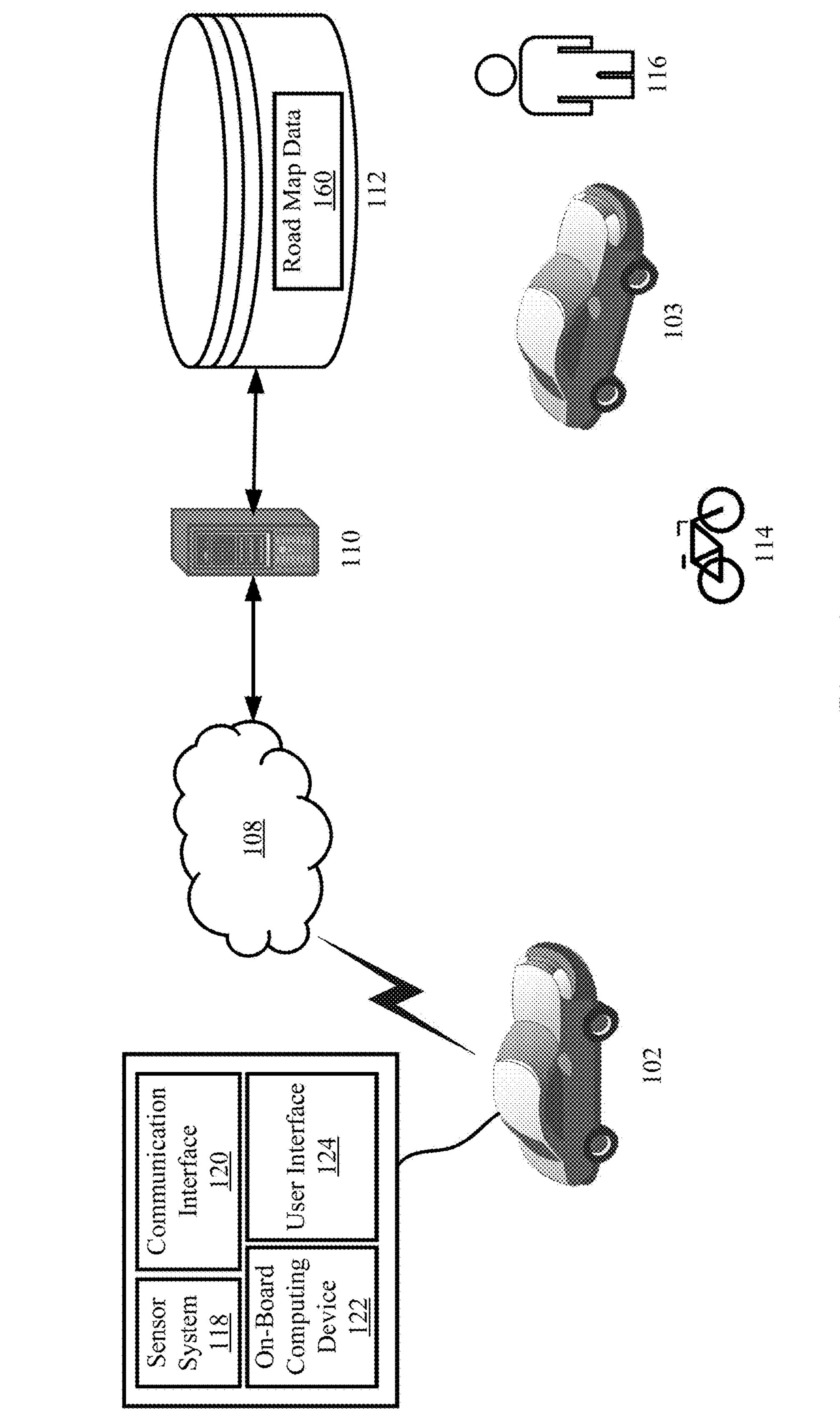
FIG. 1 illustrates a system in accordance with aspects of the disclosure.

Conventional robotic systems have a rudimentary understanding of a scene and implement static veering logic. The static veering logic of these conventional robotic systems is hard coded as the following simple logic: veer on the right side of a moving object that is located on the left side of a roadway or lane; veer on the left side of a moving object that is located on the right side of the roadway or lane; and veer on the left side of a moving object that is blocking a lane. The static veering logic does not work properly for (a) a moving object at the beginning of a lane and (b) moving objects which are queuing and have a nose crawling inside a lane. The static veering logic does not consider any queuing or yielding vehicles as well as construction zones, which limits the capabilities of object trajectory predictions and vehicle path planning.

The present solution addresses the above-stated issues with conventional systems. The present document describes system, apparatus, device, method and/or computer program product embodiments, and/or combinations and sub-combinations of any of the above, for improved scene understanding to enable a robotic system (e.g., an AV) to have awareness of a surrounding environment and be able to make decisions as to how to react to detected static and moving objects in the surrounding environment in a relatively shorter amount of time as compared to that of conventional systems. Such decisions can include determining whether the detected moving object should veer around an obstacle and determining how the detected moving object should veer (for example, to the left or right of the obstacle).

The methods generally involve: analyzing sensor data to detect a moving object in an environment and obstacle(s) that the moving object is(are) unable to traverse; generating a definition for a location of each obstacle in the environment in terms of reference frames defined for a lane and edge distances from a boundary of the lane; using the definition(s) and/or classification(s) of the obstacle(s) to detect when the moving object should or should not veer around the obstacle(s); generating the possible object trajectory based on a detection of when the object should or should not veer around the obstacle(s); and/or controlling a vehicle based on the possible object trajectory. The boundary is considered in this document as comprising the left boundary. The present solution is not limited in this regard. The right boundary may instead be used in accordance with a given application. Thus, the left and right boundary can be interchanged for given scenarios. Each reference frame defines a 2D space in terms of x-axis coordinates and y-axis coordinates. The x-axis is referred to herein as a frame axis and extends perpendicular to the y-axis which is referred to herein as a distance axis. The origin of the frame axis is aligned with the starting point of the lane, and positive coordinates of the frame axis increase in the same direction as the lane's direction of travel. The distance axis extends from the first boundary (e.g., left boundary) of the lane to a second boundary (e.g., the right boundary) of the lane and may have an origin aligned with the first boundary of the lane. The edge distances are obtained using the distance axis. The origin of the distance axis may have a different location relative to the obstacle for two or more reference frames.

In some scenarios, the definition is generated by identifying first reference frame(s) that intersect(s) the obstacle and second reference frame(s) which is(are) closest to the obstacle without intersecting the obstacle; obtaining first distance(s) from the first boundary (e.g., left boundary) of the lane to point(s) on a left edge of the obstacle and second distance(s) from the first boundary (e.g., left boundary) of the lane to point(s) on a right edge of the obstacle; and arranging identifier(s) for the first reference frame(s), identifier(s) for the second reference frame(s), the first distance (s) and the second distance(s) to provide the definition.

In those or other scenarios, the definition is generated by: identifying first reference frame(s) that intersect(s) the obstacle and second reference frame(s) which is(are) closest to the obstacle without intersecting the obstacle; obtaining a first distance from the first boundary (e.g., left boundary) of the lane to a first corner of the obstacle, a second distance from the first boundary (e.g., left boundary) of the lane to a second corner of the obstacle, a third distance from the first boundary (e.g., left boundary) of the lane to a third corner of the obstacle, and a fourth distance from the first boundary (e.g., left boundary) of the lane to a fourth corner of the obstacle; and arranging identifier(s) of the first reference frame(s), identifier(s) of the second reference frame(s), the first distance, the second distance, the third distance and the fourth distance to provide the definition. The frame identifiers may be arranged in a sequential order. The first, second, third and fourth distances may be arranged in a clockwise order. For example, at the end of the algorithm, the smallest distance and the maximum distance are obtained. Each point on the polygon is projected onto a given frame, and then the system uses the smallest value and the biggest value to define a maximum occupied space on a frame.

In those or other scenarios, the definition is generated by: identifying first reference frame(s) that intersect(s) the obstacle and second reference frame(s) which is(are) closest to the obstacle without intersecting the obstacle; obtaining a minimum distance from the first boundary (e.g., left boundary) of the lane to a left side of the obstacle and a maximum distance from the first boundary (e.g., left boundary) of the lane to a right side of the obstacle; and arranging identifier(s) of the first reference frame(s), identifier(s) of the second reference frame(s), the minimum distance and the maximum distance to provide the definition. This process may start one frame before the obstacle and end one frame after the obstacle in order to enclose completely the obstacle in the representation.

In those or other scenarios, the definition is generated using a 2D rectangle encompassing the obstacle and other obstacle(s) in the environment. The obstacles are sequentially arranged in terms of reference frames, are associated with the same two consecutive reference frames, and overlap in terms of distance from the first boundary (e.g., left boundary).

In some scenarios, a detection is made that the moving object should veer around the obstacle (i) when at least a portion of the moving object and at least a portion of the obstacle are a same distance from the first boundary (e.g., left boundary) of the lane or (ii) when a difference is less than a threshold. The difference is between a distance from the first boundary (e.g., left boundary) of the lane to a side of the moving object that is farthest from the first boundary (e.g., left boundary) and a distance from the first boundary (e.g., left boundary) of the lane to a side of the obstacle that is closest to the first boundary (e.g., left boundary). A detection is made that the moving object should not veer around the obstacle when the difference is greater than the threshold.

The definition may also be used to obtain a veering direction for the moving object. The veering direction is right when a right edge of the obstacle is closer to the moving object than a left edge of the obstacle, and is left when the left edge of the obstacle is closer to the moving object than the right edge of the obstacle. Alternatively, the veering direction is right when left and right edges of the obstacle are equidistant to the moving object and the moving object is located to a left side of the lane, and is left when the left and right edges of the obstacle are equidistant to the moving object and the moving object is located to a right side of the lane. The present solution is not limited in this regard. Other indicators may additionally or alternatively be used to understand that the moving object is traveling towards the left or right side of the obstacle. Such other indicators include, but are not limited to, a velocity vector. The system may apply other strategies when the direction of travel for the moving object is unknown or has a relatively low level of confidence associated therewith.

The methods may also comprise identifying a free space around the obstacle through which the moving object is able to traverse. The veering direction may be changed based on the free space which was identified. The free space may reside entirely inside a drivable area when the moving object is classified as a vehicle. The free space may reside inside or outside of a drivable area when the moving object is classified as a cyclist or pedestrian.

Additionally or alternatively, the methods comprise: analyzing, by a processor, sensor data to detect a moving object in an environment and at least one obstacle that the moving object is unable to traverse; generating, by the processor, a definition for a location of the obstacle in the environment in terms of reference frames defined for a lane and distances from a left boundary of the lane to edges of the obstacle; using, by the processor, the definition for the location of the obstacle and known dimensions of the moving object to detect any free space around the obstacle through which the moving object can traverse; generating, by the processor, the possible object trajectory based on the detection of any free space; and/or performing operations, by the processor, to control a vehicle based on the possible object trajectory.

The free space may reside entirely inside a drivable area within boundaries of a roadway when the moving object is classified as a vehicle. The free space may reside inside or outside of a drivable area within boundaries of a roadway when the moving object is classified as a cyclist or pedestrian. The possible object trajectory may veer the moving object around the obstacle when free space is detected or not veer the moving object around the obstacle when no free space is detected.

Each reference frame may define a 2D space in the lane in terms of a coordinate on a frame axis and coordinates on a distance axis, the frame axis extending perpendicular to the distance axis and the distance axis extending from the left boundary of the lane to a right boundary of the lane. An origin of the distance axis is aligned with the boundary (e.g., left boundary) of the lane and has a variable location on the distance axis when the left boundary of the lane curves or bends.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In this document, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Definitions for additional terms that are relevant to this document are included at the end of this Detailed Description.

Notably, this document describes the present solution in the context of an AV. However, the present solution is not limited to AV applications. The present solution may be used in other applications such as robotic applications, radar system applications, metric applications, and/or system performance applications.

FIG. 1 illustrates an example system 100, in accordance with aspects of the disclosure. System 100 comprises a vehicle 102 that is traveling along a road in a semi-autonomous or autonomous manner. Vehicle 102 is also referred to in this document as AV 102. AV 102 can include, but is not limited to, a land vehicle (as shown in FIG. 1), an aircraft, or a watercraft. As noted above, except where specifically noted this disclosure is not necessarily limited to AV embodiments, and it may include non-autonomous vehicles in some embodiments.

AV 102 is generally configured to detect objects in its proximity. The objects can include, but are not limited to, a vehicle 103, cyclist 114 (such as a rider of a bicycle, electric scooter, motorcycle, or the like) and/or a pedestrian 116.

As illustrated in FIG. 1, the AV 102 may include a sensor system 118, an on-board computing device 122, a communications interface 120, and a user interface 124. Autonomous vehicle system may further include certain components (as illustrated, for example, in FIG. 2) included in vehicles, which may be controlled by the on-board computing device 122 using a variety of communication signals and/or commands, such as, for example, acceleration signals or commands, deceleration signals or commands, steering signals or commands, braking signals or commands, etc.

The sensor system 118 may include one or more sensors that are coupled to and/or are included within the AV 102. For example, such sensors may include, without limitation, a lidar system, a radio detection and ranging (radar) system, a laser detection and ranging (LADAR) system, a sound navigation and ranging (sonar) system, one or more cameras (for example, visible spectrum cameras, infrared cameras, etc.), temperature sensors, position sensors (for example, a global positioning system (GPS), etc.), location sensors, fuel sensors, motion sensors (for example, an inertial measurement unit (IMU), etc.), humidity sensors, occupancy sensors, or the like. The sensor data can include information that describes the location of objects within the surrounding environment of the AV 102, information about the environment itself, information about the motion of the AV 102, information about a route of the vehicle, or the like. As AV 102 travels over a surface, at least some of the sensors may collect data pertaining to the surface.

The AV 102 may also communicate sensor data collected by the sensor system to a remote computing device 110 (for example, a cloud processing system) over communications network 108. Remote computing device 110 may be configured with one or more servers to perform one or more processes of the technology described in this document. Remote computing device 110 may also be configured to communicate data/instructions to/from AV 102 over network 108, to/from server(s) and/or datastore(s) 112. Datastore(s) 112 may include, but are not limited to, database(s).

Network 108 may include one or more wired or wireless networks. For example, the network 108 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 108 from datastore 112. Datastore 112 may be configured to store and supply raw data, indexed data, structured data, road map data 160, program instructions or other configurations as is known.

The communications interface 120 may be configured to allow communication between AV 102 and external systems, such as, for example, external devices, sensors, other vehicles, servers, data stores, databases, etc. The communications interface 120 may utilize any now or hereafter known protocols, protection schemes, encodings, formats, packaging, etc. such as, without limitation, Wi-Fi, an infrared link, Bluetooth, etc. The user interface system 124 may be part of peripheral devices implemented within the AV 102 including, for example, a keyboard, a touch screen display device, a microphone, and a speaker, etc. The vehicle also may receive state information, descriptive information or other information about devices or objects in its environment via the communication interface 120 over communication links such as those known as vehicle-to-vehicle, vehicle-to-object or other V2X communication links. The term "V2X" refers to a communication between a vehicle and any object that the vehicle may encounter or affect in its environment.

FIG. 2 illustrates an example system architecture 200 for a vehicle, in accordance with aspects of the disclosure. Vehicles 102 and/or 103 of FIG. 1 can have the same or similar system architecture as that shown in FIG. 2. Thus, the following discussion of system architecture 200 is sufficient for understanding vehicle(s) 102, 103 of FIG. 1. However, other types of vehicles are considered within the scope of the technology described in this document and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 for a vehicle includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine revolutions per minute (RPM) sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 260 (such as a Global Positioning System (GPS) device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 220. The vehicle on-board computing device 220 may be implemented using the computer system of FIG. 18. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 234 may be configured to control one or more auxiliary devices, such as testing systems, auxiliary sensors, mobile devices transported by the vehicle, etc.

Geographic location information may be communicated from the location sensor 260 to the vehicle on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the vehicle on-board computing device 220. The object detection information and/or captured images are processed by the vehicle on-board computing device 220 to detect objects in proximity to the vehicle. Any known or to be known technique for making an object detection based on sensor data and/or captured images can be used in the embodiments disclosed in this document.

Lidar information is communicated from lidar system 264 to the vehicle on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle. The manner in which the object detections are made by the vehicle on-board computing device 220 includes such capabilities detailed in this disclosure.

In addition, the system architecture 200 may include an onboard display device 254 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 220 may include and/or may be in communication with a routing controller 232 that generates a navigation route from a start position to a destination position for an autonomous vehicle. The routing controller 232 may access a map data store to identify possible routes and road segments that a vehicle can travel on to get from the start position to the destination position. The routing controller 232 may score the possible routes and identify a preferred route to reach the destination. For example, the routing controller 232 may generate a navigation route that minimizes Euclidean distance traveled or other cost function during the route, and may further access the traffic information and/or estimates that can affect an amount of time it will take to travel on a particular route. Depending on implementation, the routing controller 232 may generate one or more routes using various routing methods, such as Dijkstra's algorithm, Bellman-Ford algorithm, or other algorithms. The routing controller 232 may also use the traffic information to generate a navigation route that reflects expected conditions of the route (for example, current day of the week or current time of day, etc.), such that a route generated for travel during rush-hour may differ from a route generated for travel late at night. The routing controller 232 may also generate more than one navigation route to a destination and send more than one of these navigation routes to a user for selection by the user from among various possible routes.

In various embodiments, the vehicle on-board computing device 220 may determine perception information of the surrounding environment of the AV. Based on the sensor data provided by one or more sensors and location information that is obtained, the vehicle on-board computing device 220 may determine perception information of the surrounding environment of the AV. The perception information may represent what an ordinary driver would perceive in the surrounding environment of a vehicle. The perception data may include information relating to one or more objects in the environment of the AV. For example, the vehicle on-board computing device 220 may process sensor data (for example, lidar or radar data, camera images, etc.) in order to identify objects and/or features in the environment of AV. The objects may include traffic signals, roadway boundaries, other vehicles, pedestrians, and/or obstacles, etc. The vehicle on-board computing device 220 may use any now or hereafter known object recognition algorithms, video tracking algorithms, and computer vision algorithms (for example, track objects frame-to-frame iteratively over a number of time periods) to determine the perception.

In some embodiments, the vehicle on-board computing device 220 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The vehicle on-board computing device 220 may perform one or more prediction and/or forecasting operations. For example, the vehicle on-board computing device 220 may predict future locations, trajectories, and/or actions of one or more objects. For example, the vehicle on-board computing device 220 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the AV, the surrounding environment, and/or their relationship(s). For example, if an object is a vehicle and the current driving environment includes an intersection, the vehicle on-board computing device 220 may predict whether the object will likely move straight forward or make a turn. If the perception data indicates that the intersection has no traffic light, the vehicle on-board computing device 220 may also predict whether the vehicle may have to fully stop prior to entering the intersection.

In various embodiments, the vehicle on-board computing device 220 may determine a motion plan for the autonomous vehicle. For example, the vehicle on-board computing device 220 may determine a motion plan for the autonomous vehicle based on the perception data and/or the prediction data. Specifically, given predictions about the future locations of proximate objects and other perception data, the vehicle on-board computing device 220 can determine a motion plan for the AV that best navigates the autonomous vehicle relative to the objects at their future locations.

In some embodiments, the vehicle on-board computing device 220 may receive predictions and make a decision regarding how to handle objects and/or actors in the environment of the AV. For example, for a particular actor (for example, a vehicle with a given speed, direction, turning angle, etc.), the vehicle on-board computing device 220 decides whether to overtake, yield, stop, and/or pass based on, for example, traffic conditions, map data, state of the autonomous vehicle, etc. Furthermore, the vehicle on-board computing device 220 also plans a path for the AV to travel on a given route, as well as driving parameters (for example, distance, speed, and/or turning angle). That is, for a given object, the vehicle on-board computing device 220 decides what to do with the object and determines how to do it. For example, for a given object, the vehicle on-board computing device 220 may decide to pass the object and may determine whether to pass on the left side or right side of the object (including motion parameters such as speed). The vehicle on-board computing device 220 may also assess the risk of a collision between a detected object and the AV. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (for example, N milliseconds). If the collision can be avoided, then the vehicle on-board computing device 220 may execute one or more control instructions to perform a cautious maneuver (for example, mildly slow down, accelerate, change lane, or swerve). In contrast, if the collision cannot be avoided, then the vehicle on-board computing device 220 may execute one or more control instructions for execution of an emergency maneuver (for example, brake and/or change direction of travel).

As discussed above, planning and control data regarding the movement of the autonomous vehicle is generated for execution. The vehicle on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 3:
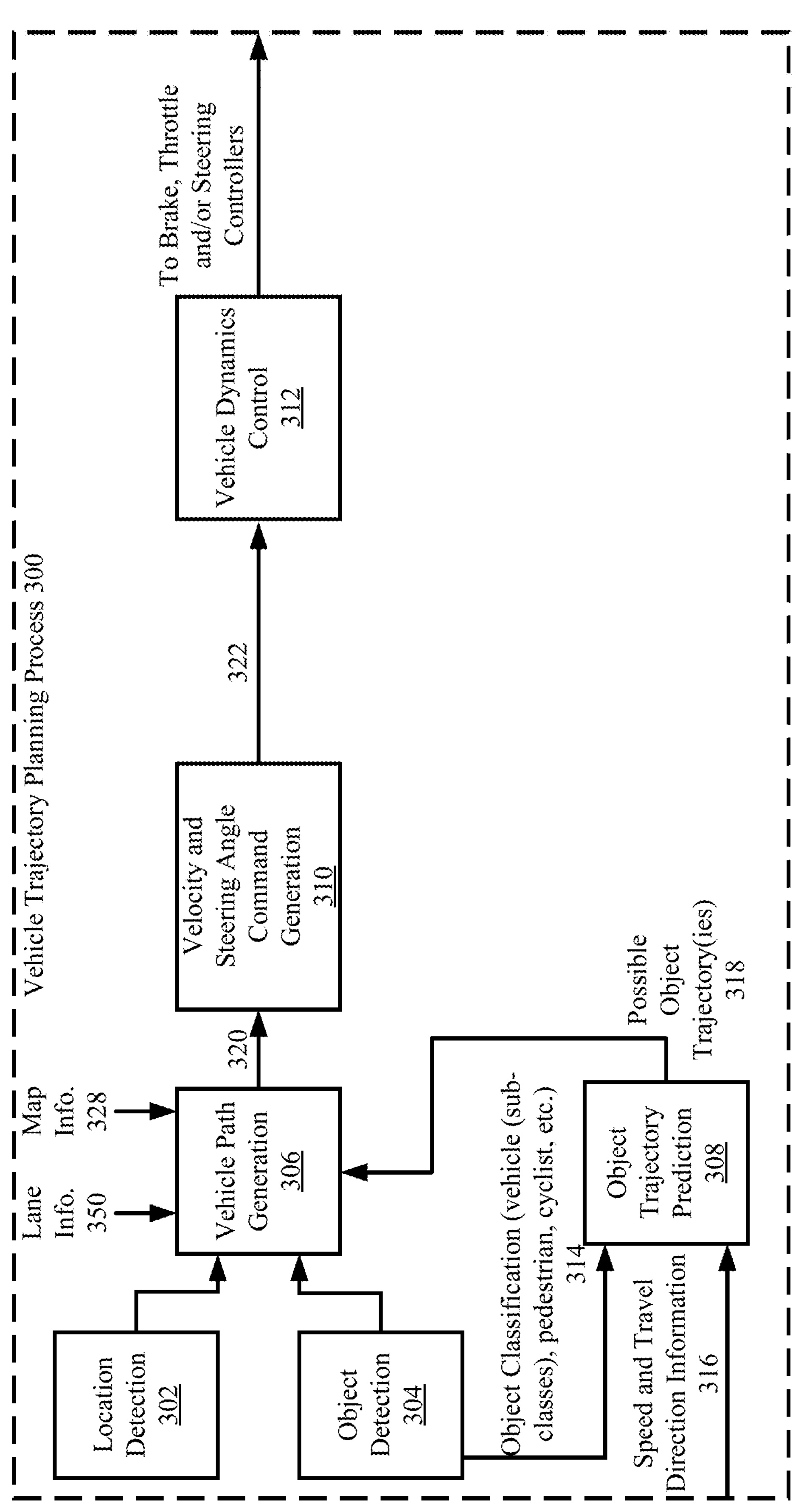
FIG. 3 illustrates how a vehicle may be controlled in accordance with aspects of the disclosure.

FIG. 3 provides a block diagram that is useful for understanding how control of a vehicle is achieved in accordance with the present solution. All of the operations performed in blocks 302-312 can be performed by the on-board computing device of a vehicle (for example, AV 102 of FIG. 1).

In block 302, a location of the vehicle is detected. This detection can be made based on sensor data output from a location sensor (for example, location sensor 260 of FIG. 2) of the vehicle. This sensor data can include, but is not limited to, GPS data. The detected location of the vehicle is then passed to block 306.

In block 304, an object is detected within proximity of the vehicle. This detection is made based on sensor data output from one or more sensors (for example, sensor(s) 260-268 of FIG. 2) of the vehicle. Information about the detected object is passed to block 306. This information includes, but is not limited to, a speed of the object and/or a direction of travel of the object.

In block 306, a vehicle path 320 is generated using the information from blocks 302, 304, map information 328 (which is pre-stored in a data store of the vehicle), lane information 350, and possible object trajectory(ies) 318 from block 308. Any known or to be known technique for determining a vehicle path can be used here. The manner in which the possible object trajectory(ies) 318 is(are) generated in block 308 will be discussed below. The vehicle path 320 represents a smooth path that does not have abrupt changes that would otherwise provide passenger discomfort. The vehicle path 320 is then provided to blocks 310. In block 310, velocity and steering commands 322 are generated based on the vehicle path 320. Any known or to be known technique for generating velocity and steering commands can be used here. The velocity and steering commands 322 are provided to block 312 for vehicle dynamics control.

As shown in FIG. 3, an object classification is performed in block 304 to classify the detected object into one of a plurality of classes and/or sub-classes. The classes can include, but are not limited to, a vehicle class and a pedestrian class. The vehicle class can have a plurality of vehicle sub-classes. The vehicle sub-classes can include, but are not limited to, a bicycle sub-class, a motorcycle sub-class, a skateboard sub-class, a roller blade sub-class, a scooter sub-class, a sedan sub-class, an SUV sub-class, and/or a truck sub-class. The object classification is made based on sensor data output from sensor(s) of the vehicle. Any known or to be known object classification technique can be used here. Information 314 specifying the object's classification is provided to block 308, in addition to the information 316 indicating the object's actual speed and direction of travel.

Block 308 involves determining one or more possible object trajectories for the object detected in 304. The possible object trajectories can include, but are not limited to, the following trajectories: a trajectory defined by the object's actual speed (for example, 1 mile per hour) and actual direction of travel (for example, west); a trajectory defined by the object's actual speed (for example, 1 mile per hour) and another possible direction of travel (for example, south, south-west, or X (for example, 40°) degrees from the object's actual direction of travel in a direction towards the AV) for the object; a trajectory defined by another possible speed for the object (for example, 2-10 miles per hour) and the object's actual direction of travel (for example, west); and/or a trajectory defined by another possible speed for the object (for example, 2-10 miles per hour) and another possible direction of travel (for example, south, south-west, or X (for example, 40°) degrees from the object's actual direction of travel in a direction towards the AV) for the object. The possible speed(s) and/or possible direction(s) of travel may be pre-defined for objects in the same class and/or sub-class as the object. The one or more possible object trajectories 318 is(are) then passed to block 306 as mentioned above.

FIG. 4 provides a flow diagram of an illustrative method 400 for determining a possible object trajectory and/or controlling an AV (for example, AV 102 of FIG. 1) using the same. All or some of the operations of method 400 can be performed by an onboard computing device (for example, onboard computing device 122 of FIGS. 1 and/or 220 of FIG. 2) of the AV and/or a remote computing device (for example, server 110 of FIG. 1). Some of the operations of method 400 can be performed in a different order than that shown in FIG. 4 in accordance with a given application of the present solution.

Method 400 begins with 402 and continues with 404 where sensor data is obtained by the computing device. The computing device analyzes the sensor data in 406 to detect a moving object in an environment. In 408, the computing device performs operations to identify a lane which the moving object occupies. Other lanes can also be identified that are adjacent to or otherwise proximate to (for example, within 0-5 miles of) the lane which the moving object occupies.

In 410, the sensor data is further analyzed to detect obstacle(s) in the lane(s) identified in 408. An obstacle is something that cannot be traversed. An obstacle may occupy one or more lanes of a roadway. An illustration is provided in FIG. 5 which shows two obstacles 512, 514 which occupy a portion of a lane 500. Obstacle 512 protrudes into the lane 500 from its right boundary 504, and obstacle 514 protrudes into the lane 500 from its left boundary 502. The present solution is not limited to the particulars of FIG. 5.

In 412, the computing device generates a definition for the location of each obstacle (regardless of orientation) in the environment in terms of reference frames and edge distances from the left boundary of the lane. Reference frames per object include reference frames defined for the lane that intersect the obstacle and reference frames defined for the lane which are the closest reference frames to the obstacle without intersecting the obstacle. The origin "0" of the distance axis is aligned with the left boundary of the lane. The location of the origin can change for an object that resides on a left boundary which is angled relative to (i.e., not perpendicular to) the distance axis. This will become more evident as the discussion progresses.

Figure 6:
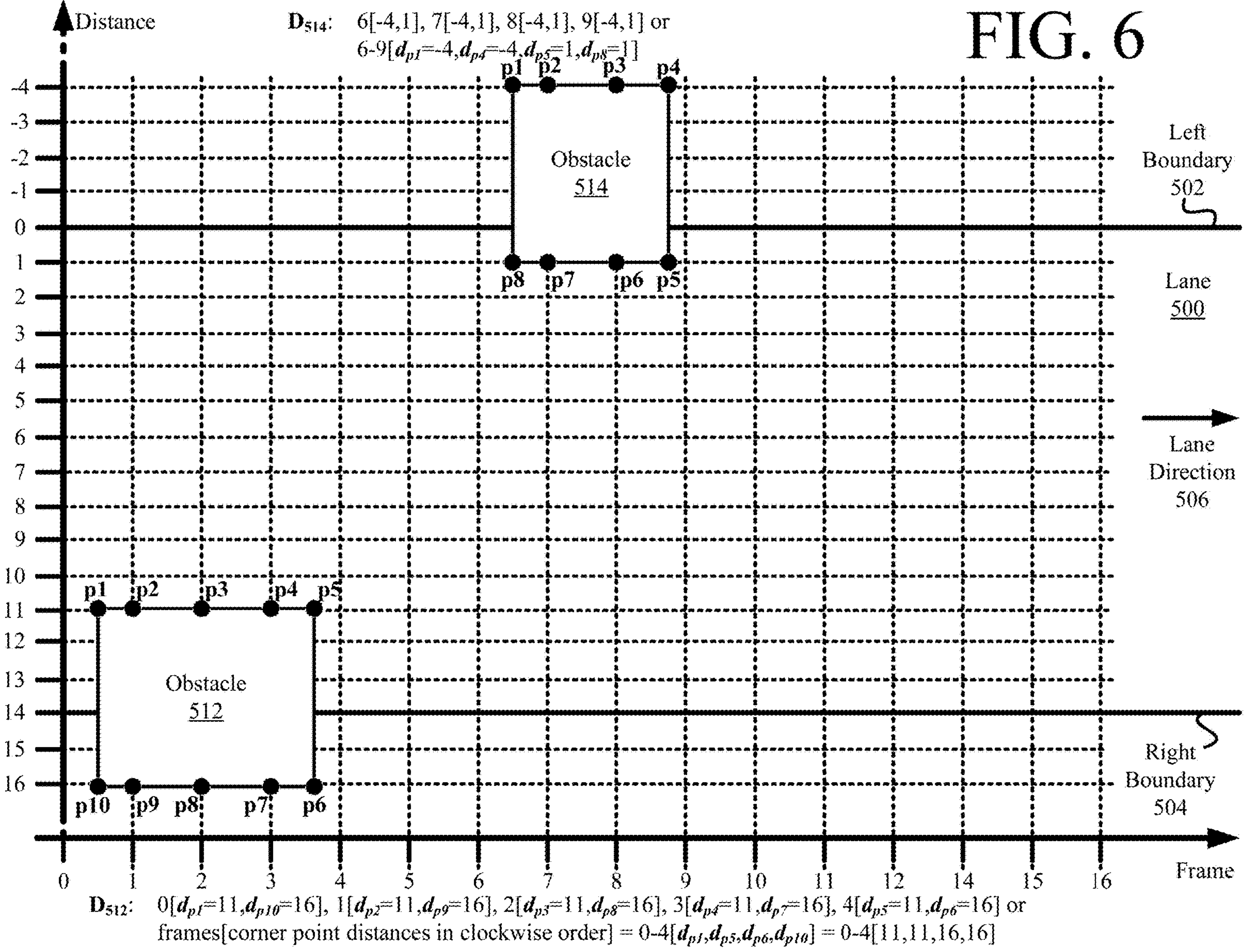
FIG. 6 illustrates how to derive a definition for the obstacles of FIG. 5.

For example, as shown in FIG. 6, the following definitions $D_{512}$, $D_{514}$ are generated for obstacles 512 and 514.

$$D_{512} = 0[11, 16], 1[11, 16], 2[11, 16], 3[11, 16], 4[11, 16] \text{ or } 0\text{–}4[11, 11, 16, 16]$$

$$D_{514} = 6[-4, 1], 7[-4, 1], 8[-4, 1], 9[-4, 1] \text{ or } 6\text{–}9[-4, -4, 1, 1]$$

The definition $D_{512}$ for obstacle 512 is generated by: identifying the reference frames which intersect the obstacle 512 (i.e., reference frames "1", "2", "3"); identifying other reference frames which are the closest reference frames to the obstacle without intersecting the obstacle (i.e., reference frames "0" and "4"); obtaining, for each identified reference frame, a distance from the left boundary 502 of the lane 500 to a left side of the obstacle 512 and a distance from the left boundary 502 of the lane 500 to a right side of the obstacle 512; and arranging the identified reference frames and distances to define a definition for the obstacle 512. The reference frames and distances can be arranged in various ways. In a first arrangement, each reference frame is associated with a first distance from the left boundary 502 to a point on the left side of the obstacle 512 and a second distance from the left boundary 502 to a point on the right side of the obstacle 512. For example, the portion of the definition for obstacle 512 associated with reference frame "0" would be written as 0[distance for point p1, distance for point p10]=0[$d_{p1}$, $d_{p10}$]=0[11,16]. The portion of the definition for obstacle 512 associated with reference frame "1" would be written as 1[distance for point p2, distance for point p9]=0[$d_{p2}$, $d_{p9}$]=0[11,16], and so on. In a second arrangement, the definition for obstacle 512 comprise the reference frames followed by a set of distances for each of the four corner points of the obstacle 512, i.e., 0-4[$d_{p1}$, $d_{p5}$, $d_{p6}$, $d_{p10}$]=0-4[11,11,16,16]. The definition $D_{514}$ for object 514 is generated in a similar manner.

Figure 5:
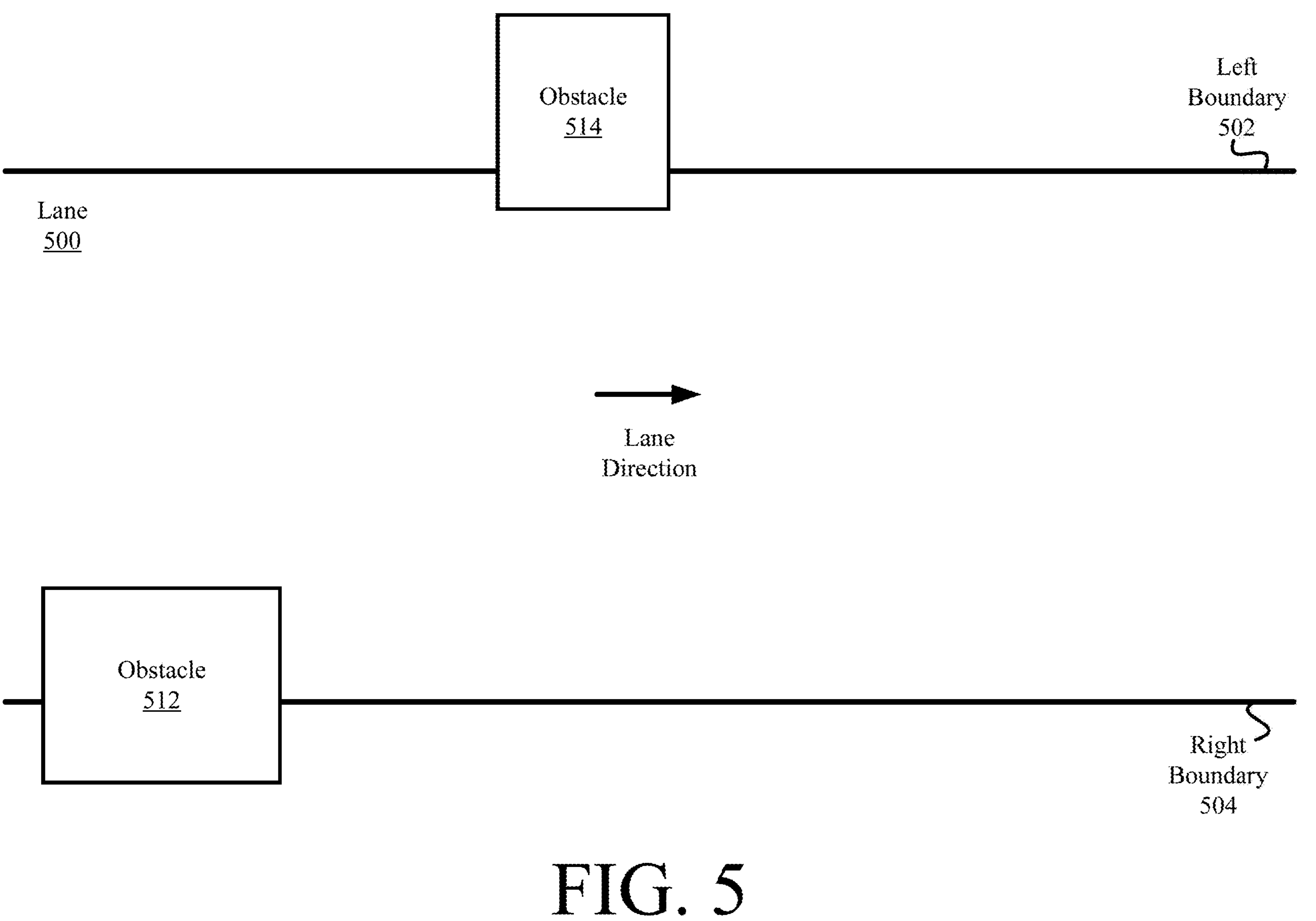
FIG. 5 illustrates a lane with obstacles.
Figure 7:
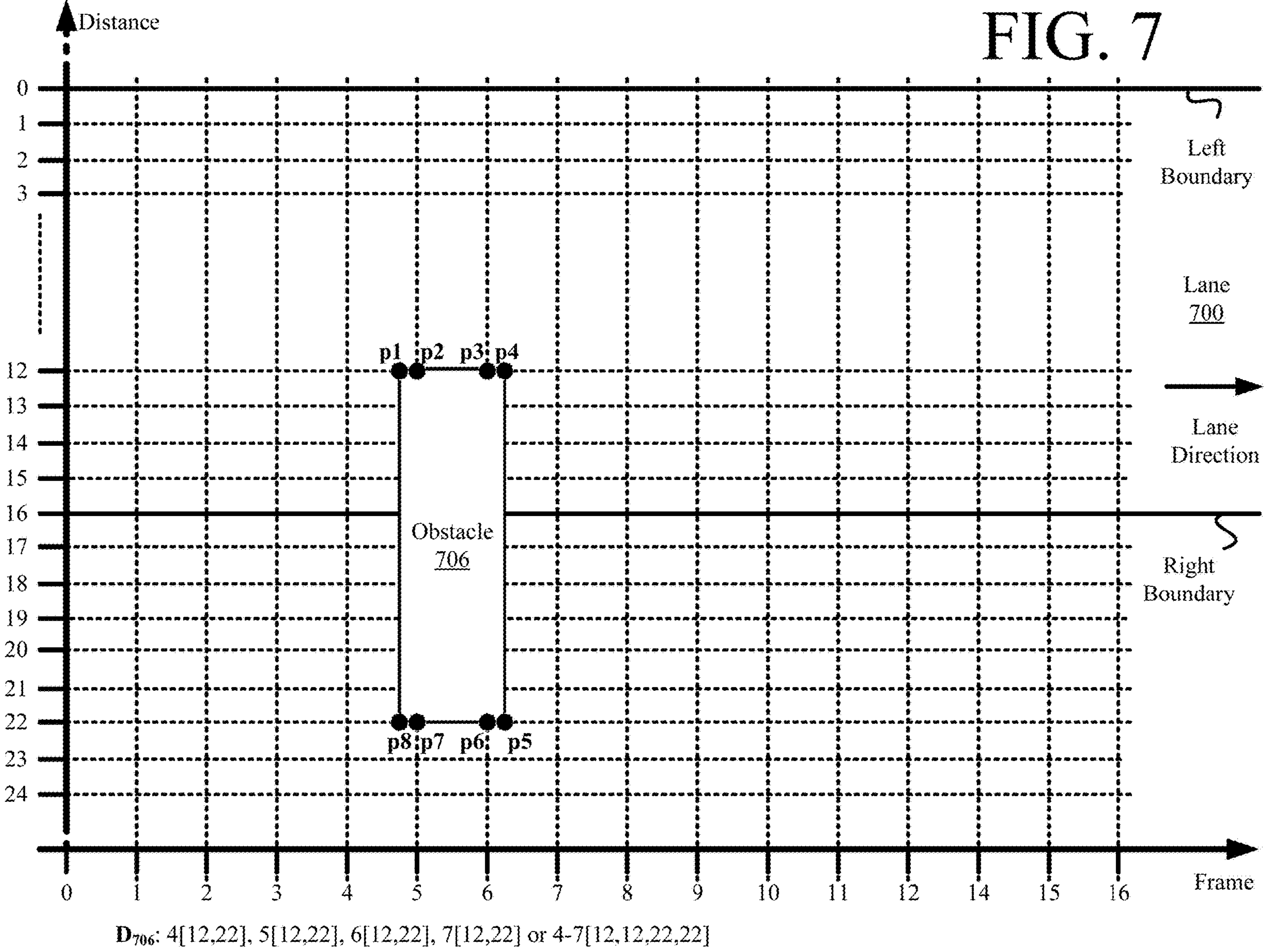
FIGS. 7-14 each illustrate how to derive definitions for the obstacles in various scenarios.

As shown in FIG. 7, the following definition $D_{706}$ is generated for obstacle 706 which has a different orientation than obstacles 512, 514 of FIGS. 5-6. Obstacle 706 may comprise a moving object that is queued or slowing entering lane 700.

$$D_{706} = 4[12, 22], 5[12, 22], 6[12, 22], 7[12, 22] \text{ or } 4\text{–}7[12, 12, 22, 22]$$

The definition $D_{706}$ is generated in a manner similar to that performed for generating definitions $D_{512}$ and $D_{514}$. It is evident from FIGS. 6-7 that the definition can be generated for an object in accordance with the present solution regardless of its orientation.

Figure 8:
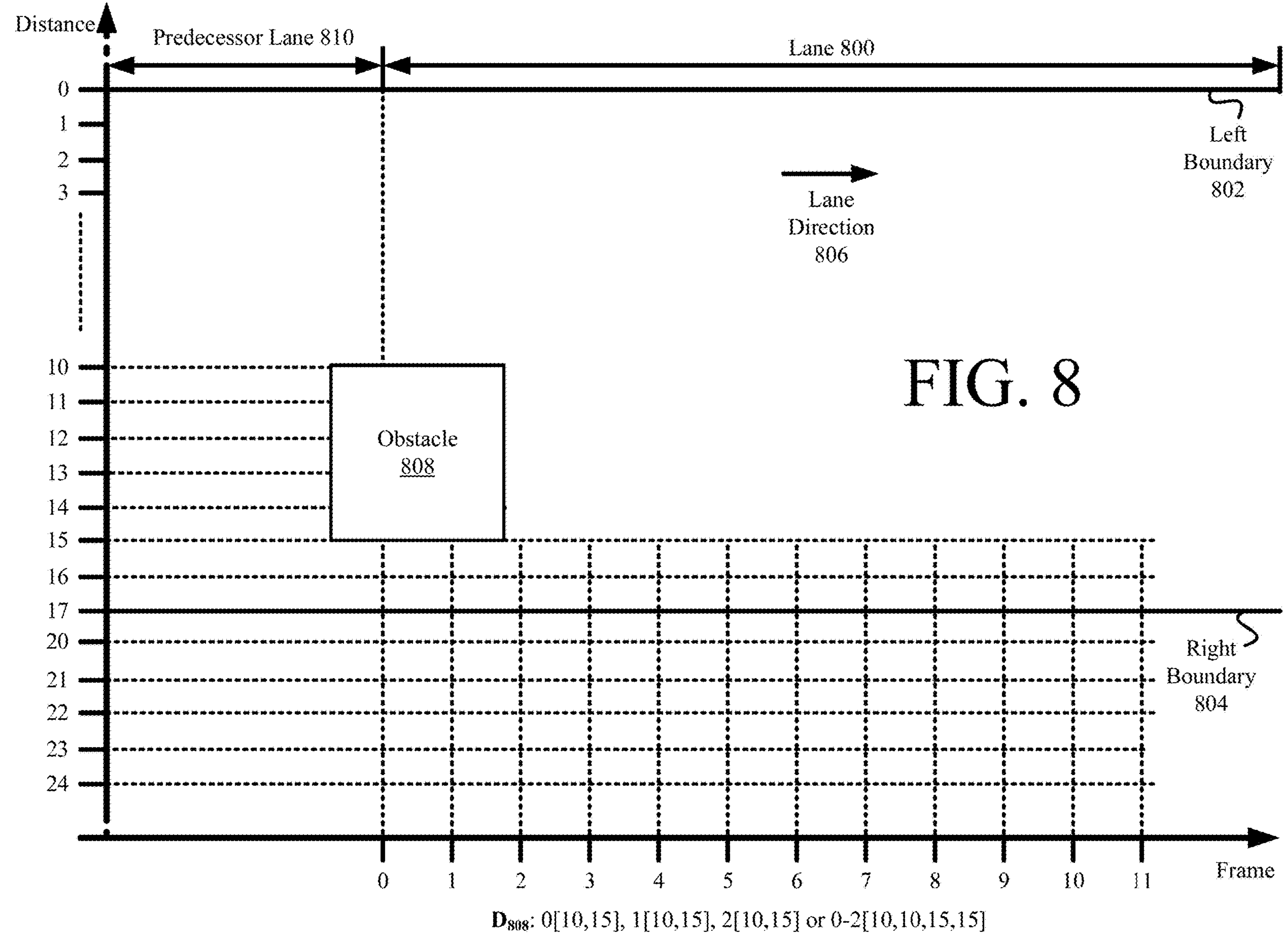
Figure 9:
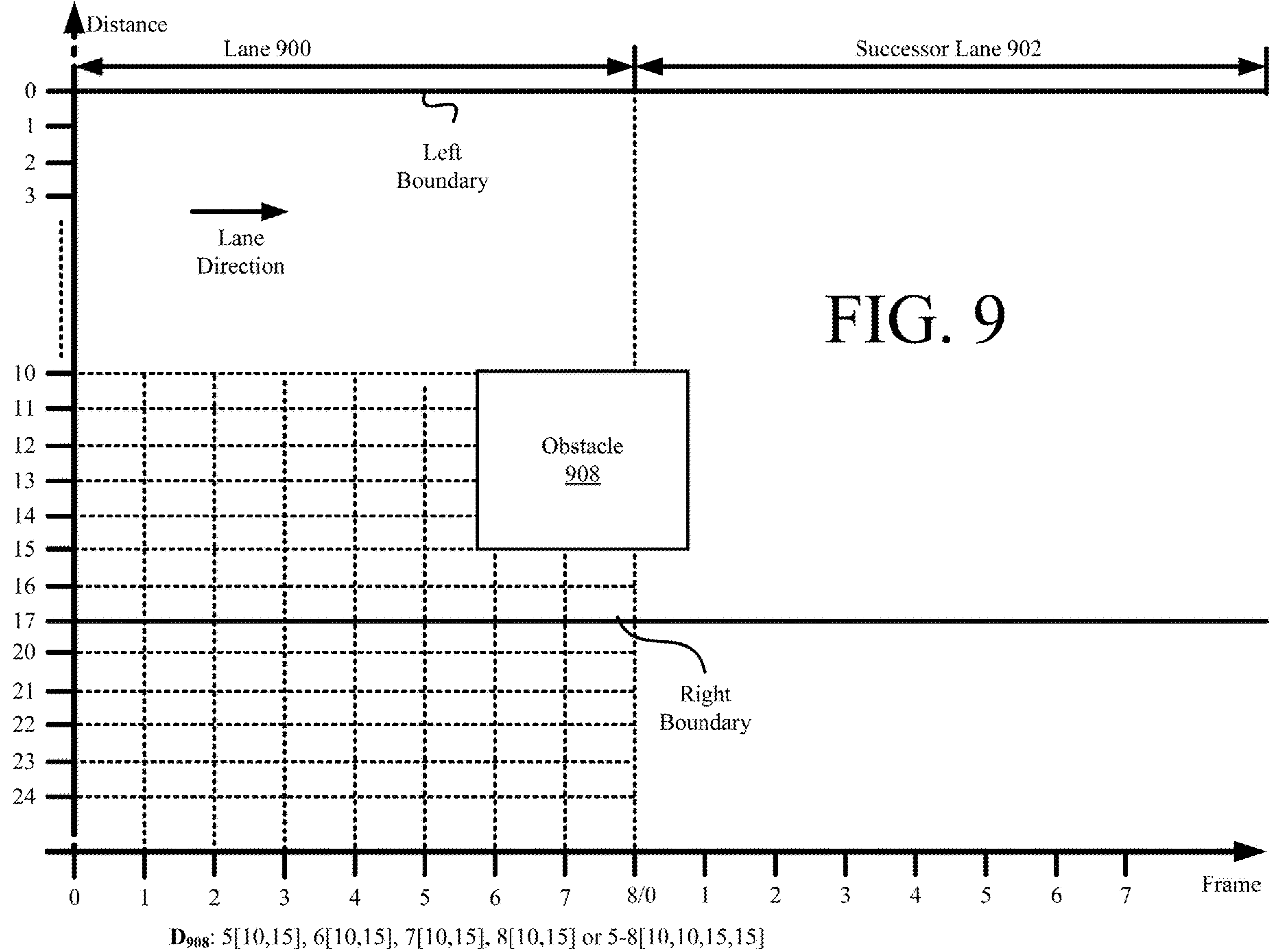

As shown in FIGS. 8-9, obstacles may reside in two lanes. More specifically, obstacle 808 of FIG. 8 partially resides in lane 800 and partially resides in a predecessor lane 810. Obstacle 908 of FIG. 9 partially resides in lane 900 and partially resides in a successor lane 902. The definitions $D_{808}$, $D_{908}$ can be generated in a manner similar to that discussed above in relation to FIGS. 6-8 with some differences. These definitions can be expressed as follows.

$$D_{808} = 0[10, 15], 1[10, 15], 2[10, 15] \text{ or } 0-2[10, 10, 15, 15]$$

$$D_{908} = 5[10, 15], 6[10, 15], 7[10, 15], 8[10, 15] \text{ or } 5-8[10, 10, 15, 15]$$

It should be noted that the first reference frame in definition $D_{808}$ is reference frame "0" since obstacle 808 extends from predecessor lane 810 to the current lane 800, and the last reference frame in definition $D_{908}$ is the last reference frame "8" of the current lane 900 since obstacle 908 extends from lane 900 into the successor lane 902. Another definition is provided for obstacle 808 for the predecessor lane 810, and another definition is provided for obstacle 908 for the successor lane 902. The last reference frame of the predecessor lane 810 is aligned with the first reference frame (i.e., reference frame "0") of lane 800. Similarly, the first reference frame of the successor lane 902 is aligned with the last reference frame (i.e., reference frame "8") of lane 900. Thus, the entire location of each obstacle is specified collectively by the two definitions that are generated therefore.

Figure 10:
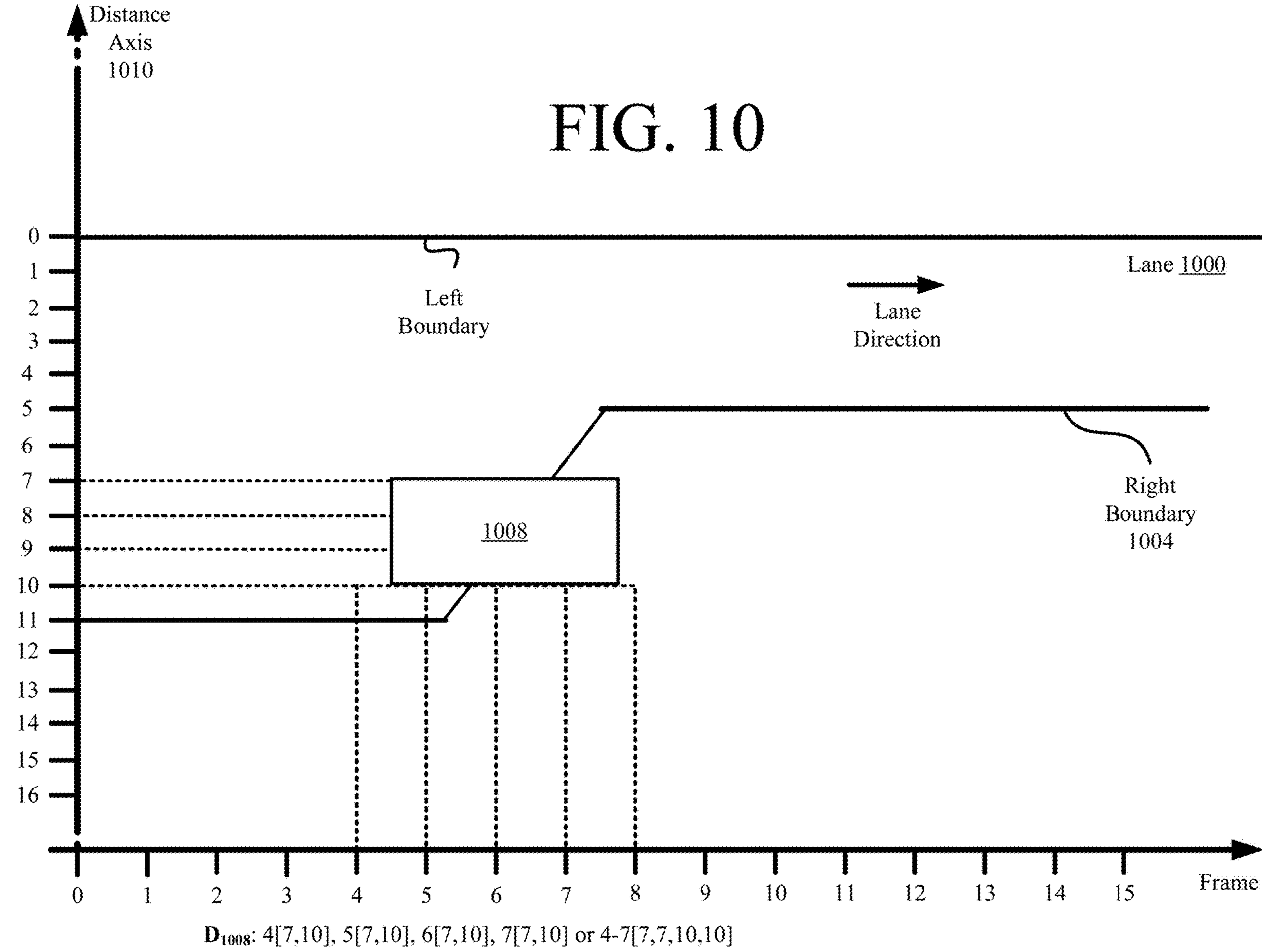

A width of a lane may change or a portion of the lane may be angled relative to the distance axis. FIGS. 10-11 illustrate how definitions for objects in these scenarios may be generated. In FIG. 10, an obstacle 1008 resides on a portion of the right boundary 1004 of a lane 1000 that is angled relative to the distance axis 1010. The following definition $D_{1008}$ is generated for obstacle 1008 in the same manner as discussed above in relation to FIGS. 6-7.

$$D_{1008} = 4[7, 10], 5[7, 10], 6[7, 10], 7[7, 10] \text{ or } 4-7[7, 7, 10, 10]$$

Figure 11A:
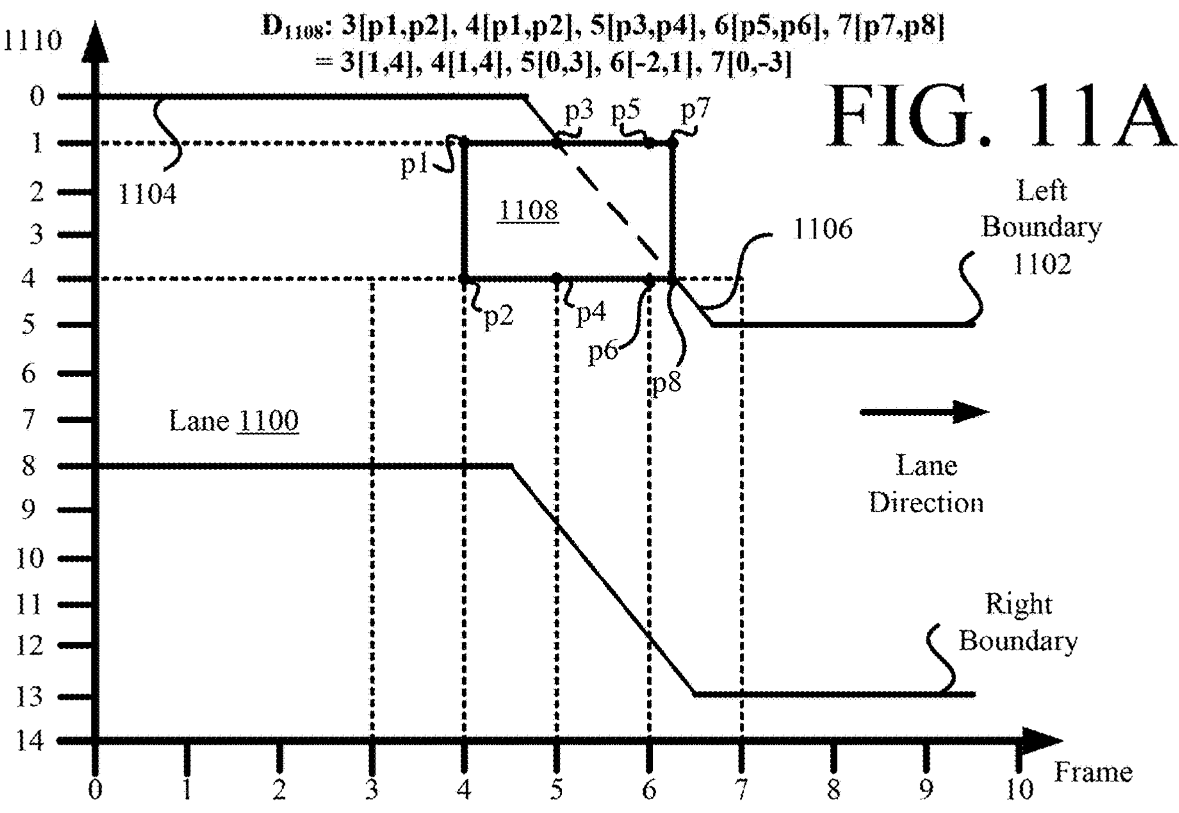
Figure 11B:
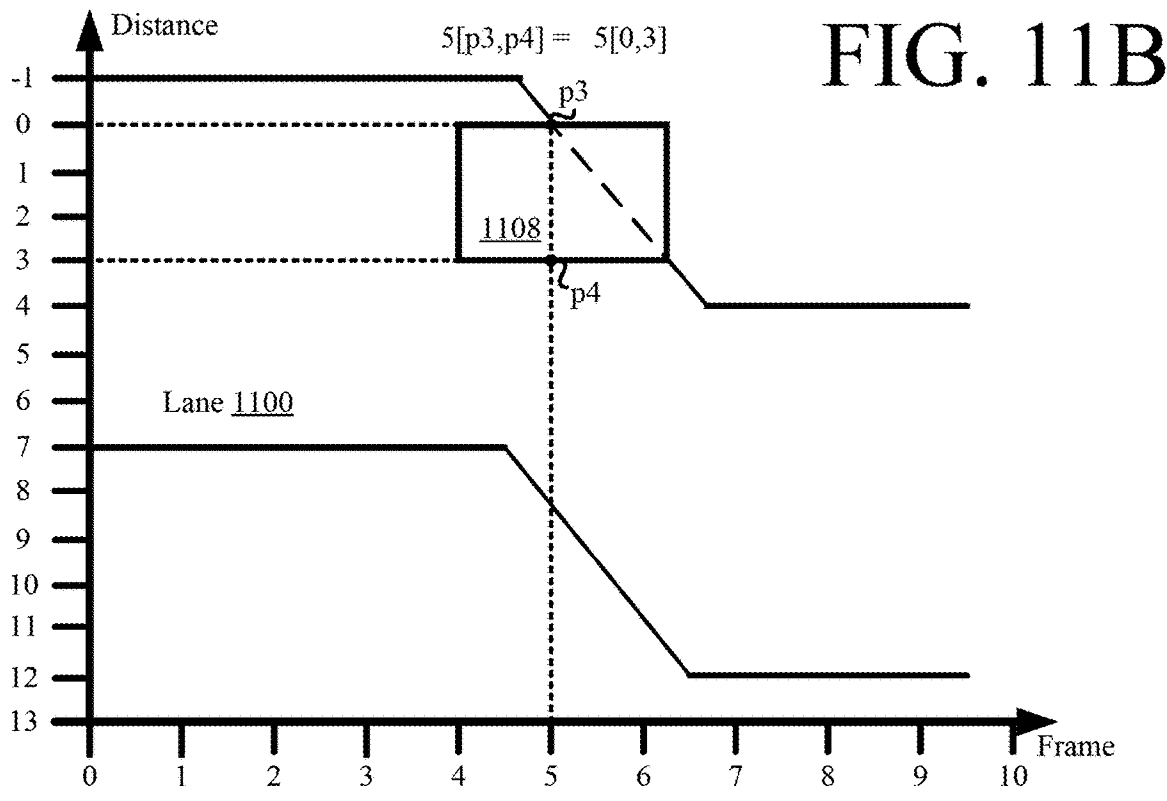
Figures 11C, 11D:
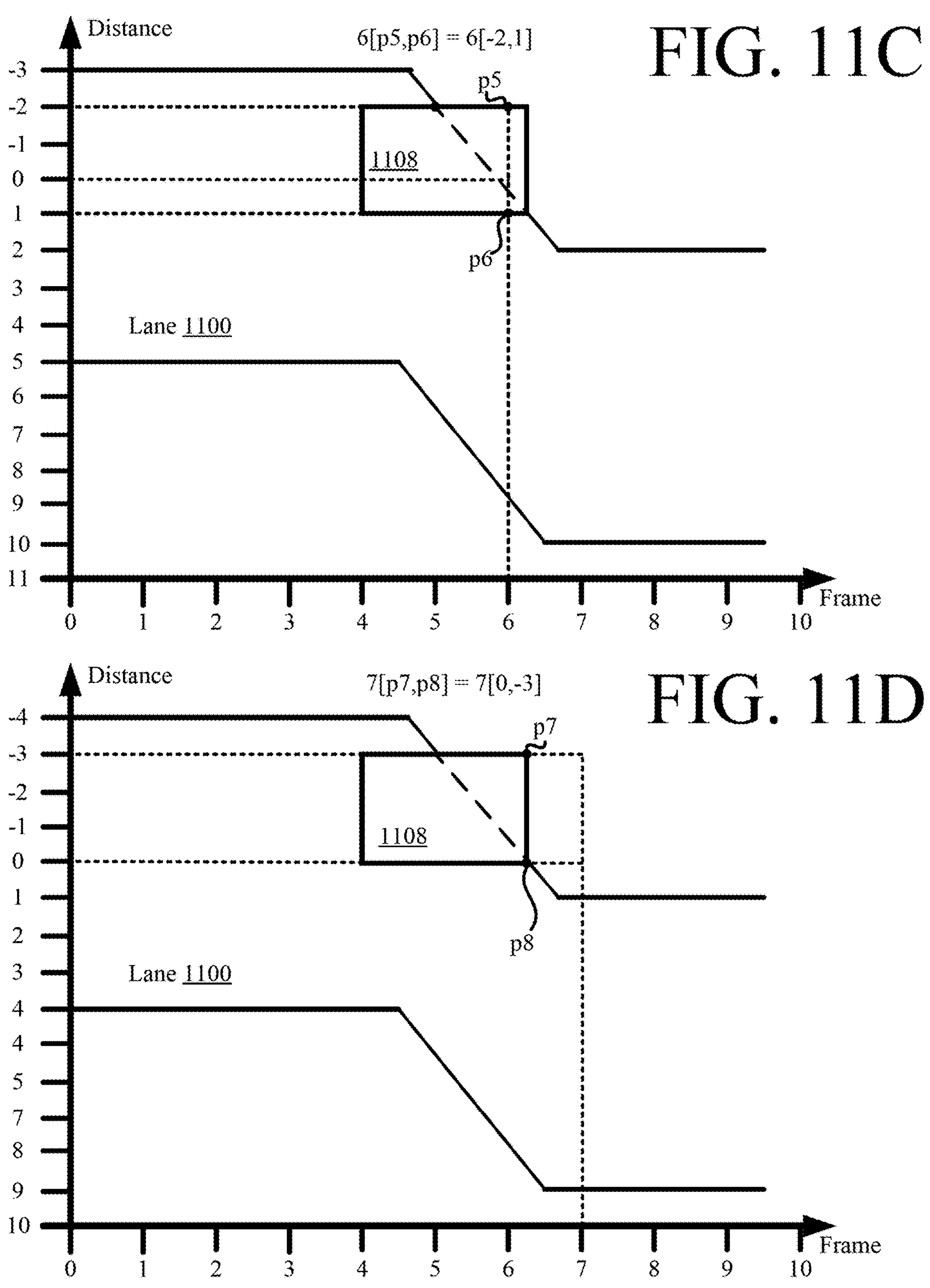

In contrast, an obstacle 1108 in FIG. 11 resides on a portion of the left boundary 1102 of a lane 1100 that is angled relative to the distance axis 1110. The origin "0" of the distance axis 1110 may be re-positioned for certain reference frames in accordance with the left boundary 1102 of the lane 1100. For example, as shown in FIG. 11A, the origin of distance axis 1110 is aligned with horizontally extending portion 1104 of the left boundary 1102. Since portion 1104 is generally perpendicular to axis 1110, the angle between portion 1104 of the left boundary 1102 is ninety degrees. So, the origin remains the same for reference frames "0", "1", "2", "3", "4". However, the origin is different for reference frames "5", "6", "7" as shown in FIGS. 11Bn-11D since portion 1106 of the left boundary 1102 is no longer perpendicular to the distance axis 1110. The origin "0" is adjusted such that it always resided on the left boundary 1102. So, for reference frame "5", the original "0" is shifted down by one increment for reference frame "5", shifted down by three increments for reference frame "6", and shifted down by four increments for reference frame "7". The present solution is not limited to the particulars of FIG. 11. The origin can be shifted up or down by any amount in accordance with a given application.

Figure 12:
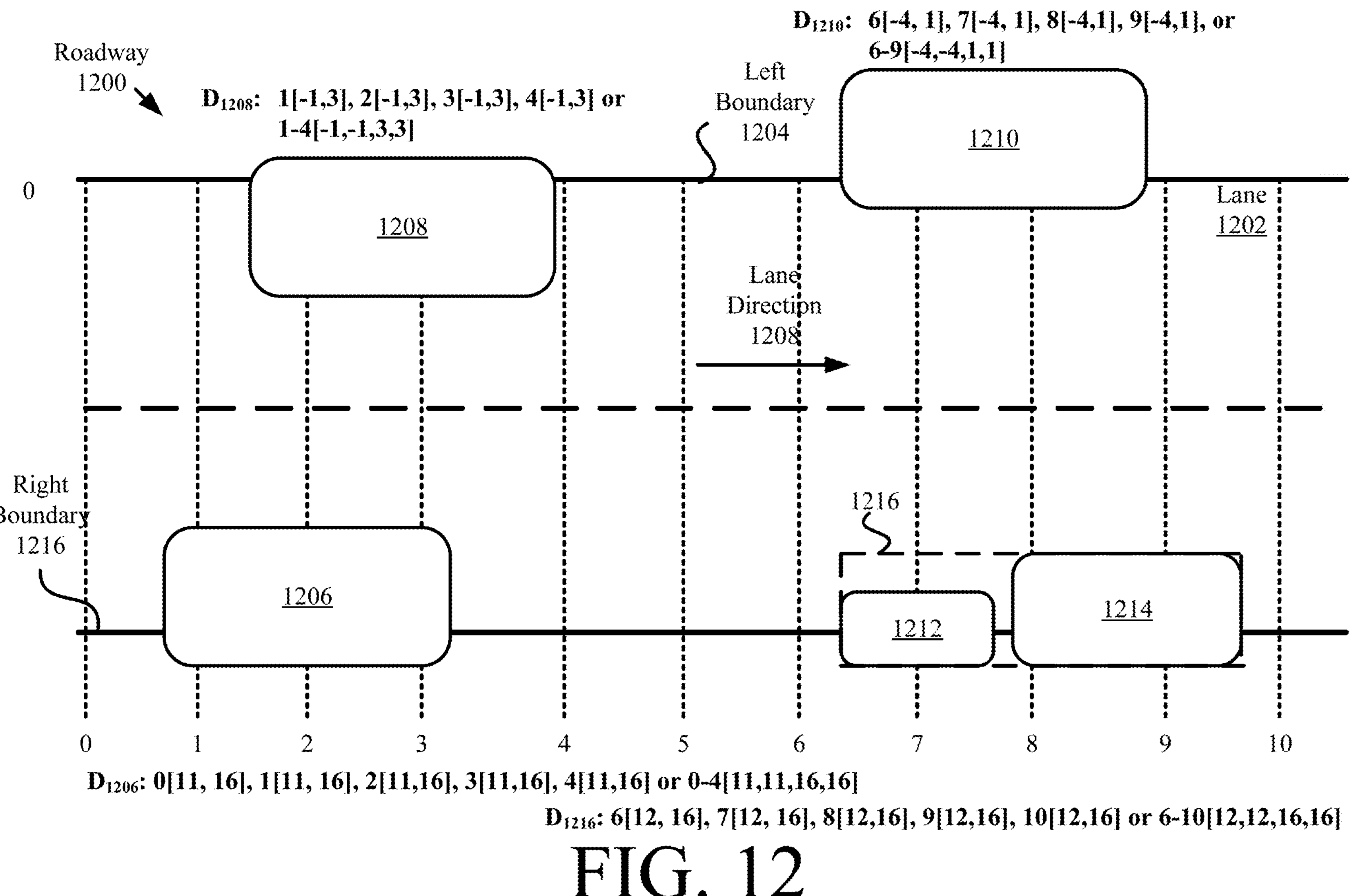

In some scenarios, obstacles may reside on both sides of a lane or roadway and be associated with one or more of the same reference frames. Obstacles may additionally or alternatively reside on the same side of the lane and be associated with one or more of the same distances from the left boundary. These scenarios are illustrated in FIG. 12. In FIG. 12, obstacles 1206, 1212, 1214 resides on the right boundary 1216 of lane 1202 and obstacles 1208, 1210 reside on the left boundary 1204 of lane 1202. The definitions $D_{1206}$, $D_{1208}$, $D_{1210}$ are generated in the same or similar manner as that discussed above in relation to FIGS. 6-7. However, it should be noted that reference frames "2" and "3" intersect both obstacles 1206 and 1208, while reference frame "1" intersects obstacle 1206 and is the closest reference frame to the rear of obstacle 1208 and reference frame "4" is the closest reference frame to the front of obstacles 1206, 1208. Thus, the definitions for obstacles 1206, 1208 both include information for reference frames "1", "2", "3" and "4". Consequently, obstacles 1206, 1208 are considered as overlapping in terms of reference frames.

With regard to obstacles 1212 and 1214, a combined definition may be generated in a similar manner as that discussed above in relation to FIGS. 6-7 since the obstacles 1212 and 1214 are sequentially arranged in terms of reference frames, are associated with the same two consecutive reference frames "7" and "8", and overlap in terms of distance from the left boundary 1204. A single obstacle footprint 1216 is considered for generating the combined definition $D_{1216}$ for obstacles 1212, 1214.

Figures 13, 14:
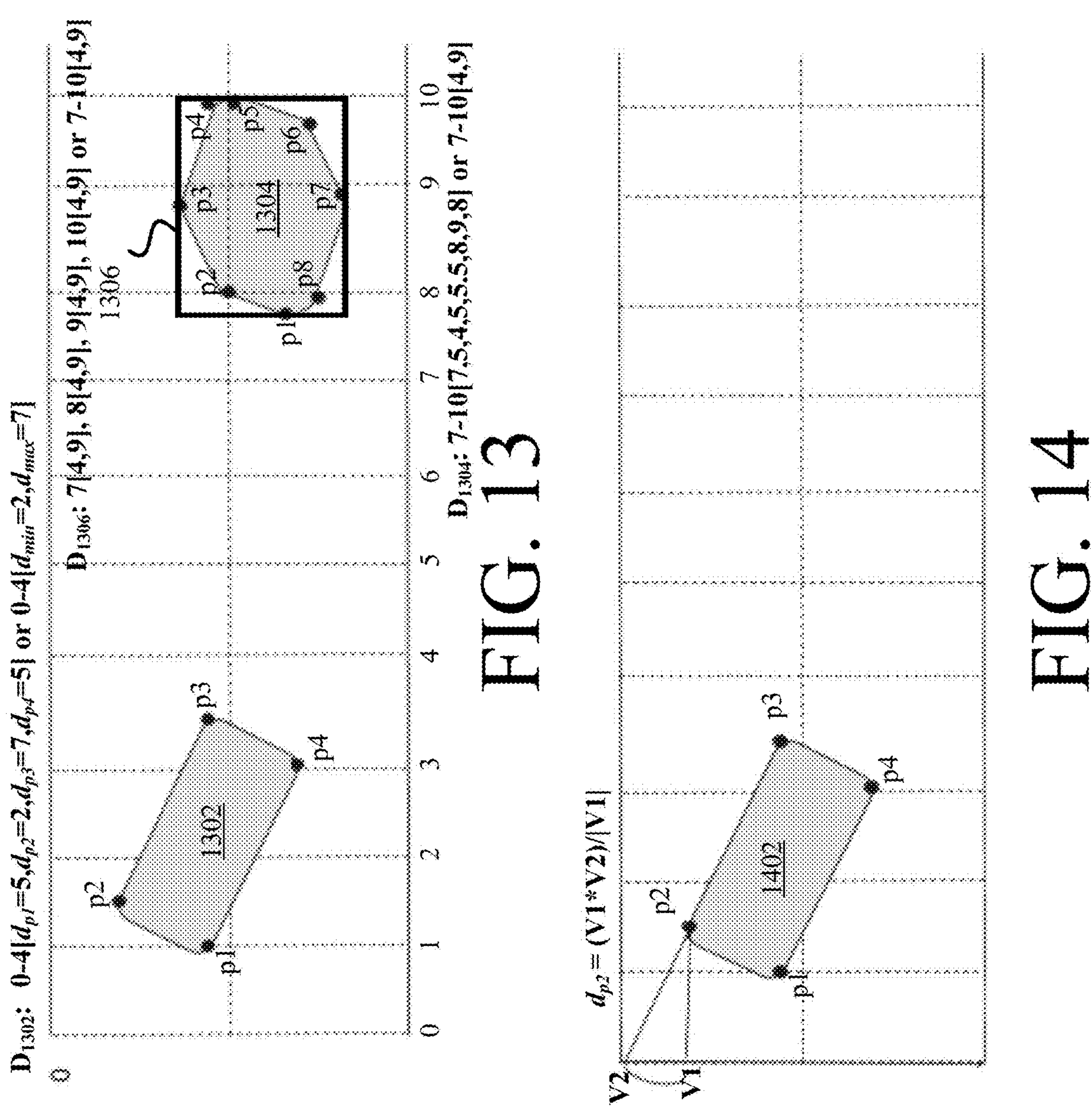

In those or other scenarios, the obstacles may have shapes other than rectangular shapes and/or have an orientation that is angled (i.e., its vertical central axis and horizontal central axis are not parallel or perpendicular) relative to the distance axis. This is shown in FIGS. 13-14. The following mathematical equation may be used to determine the distances from the left boundary of a lane to each corner point of an obstacle 1302.

$$D_{pn} = (V1 * V2)/|V1|$$

where $D_{pn}$ represents a distance from a left lane boundary to a point on an obstacle in the reference frame, V1 represents a distance value from drawing a line to extend an edge of the obstacle to the distance axis, and V2 represents a distance value from drawing a line that is perpendicular to the distance axis and extends between the distance axis and the point on the obstacle.

With regard to the polygon shaped obstacle 1304, the definition $D_{1304}$ can be determined by identifying the reference frames that intersect the obstacle, identifying other reference frames that are closest to the front and rear of the obstacle, and determining distances from the left lane boundary to each point on the obstacle. Definition $D_{1304}$ can be expressed as follows.

$$D_{1304} = 7-10[7, 5, 4, 5, 5.5, 8, 9, 8] \text{ or } 7-10[4, 9]$$

The present solution is not limited in this regard. The definition for obstacle 1304 could alternatively be determined in a different manner. In this case, the system identifies the front most point p5, rear most point p1, left most point p3 and right most point p7. A rectangular footprint 1306 for the obstacle 1304 is generated using the identified points p1, p3, p5, p7 thereon. A definition $D_{1306}$ is then generated for the rectangular footprint 1306 rather than for the polygon shaped obstacle 1304. The present solution is not limited to the particulars of FIGS. 13-14.

Referring again to FIG. 4, method 400 continues with 414 once the definition(s) for the obstacle(s) has(have) been generated. 414 involves obtaining classification(s) for the obstacle(s). Any known or to be known object classification technique can be used here. A table is built in 416 using the obstacle definitions and classifications. The table can include, but is not limited to, a look up table (LUT). The LUT may comprise a list of object class types (e.g., construction, parked, lane blocking, yielding, queued, etc.). Each object type class is stored so as to be associated with a respective lane and a respective definition. The lane can provide an index for the LUT. Illustrative LUTs 1500, 1600, 1700 are shown in FIGS. 15-17.

Figure 29:
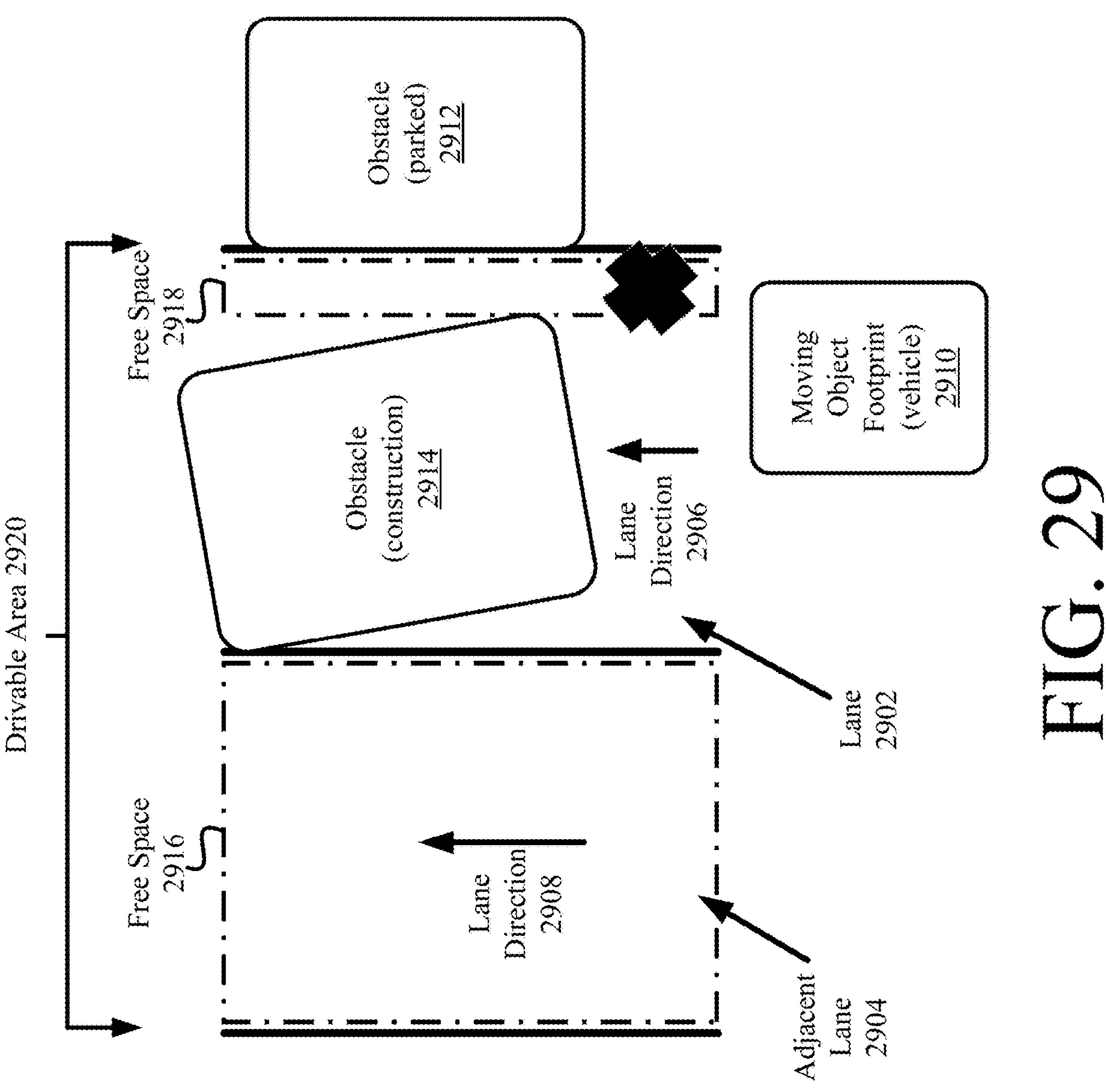
FIGS. 29-30 illustrate free space for moving objects to veer around obstacles.

In optional 418, the system determines whether there is free space around the obstacles in which the moving object is able to fit or through which the moving object is able traverse. When the moving object is a vehicle, the free space is the space inside the drivable area (e.g., the area in a roadway). When the moving object is a cyclist or pedestrian, the free space is the space inside and outside of the drivable area. Illustrations are provided in FIGS. 29-30 to facilitate an understanding of free space in both scenarios. As shown in FIG. 29, the moving object 2910 comprises a vehicle traveling in lane 2902 in a direction 2906 towards obstacles 2912, 2914. Since the moving object 2910 is a vehicle, the system considers the area inside the drivable area for detecting free space. The drivable area is the area within the boundaries of a roadway. The system identifies a free space 2918 in lane 2902 located between obstacles 2912, 2914 and a free space 2916 in an adjacent lane 2904 to the left of obstacle 2914. Since the system knows the dimensions of object 2910, it is able to conclude that the free space 2918 is too small for the moving object 2910 to fit through. So, free space 2918 is disqualified. However, free space 2916 is large enough for the moving object 2910 to fit through. Thus, the system concludes that free space does exist around the obstacles for the moving object to fit or traverse.

Figure 30:
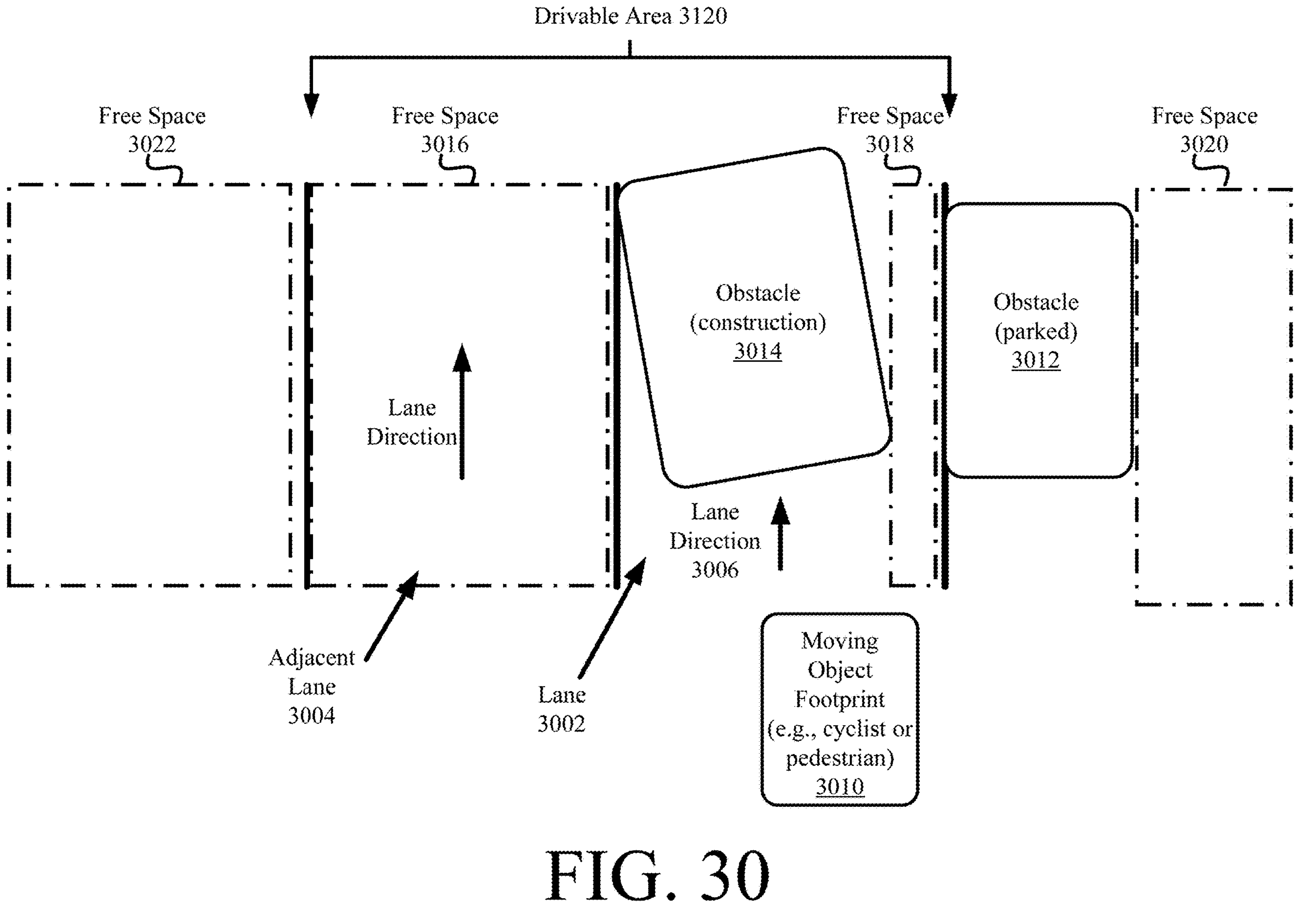

As shown in FIG. 30, the moving object 3010 comprises a cyclist or pedestrian traveling in lane 3002 in a direction 3006 towards obstacles 3012, 3014. Since the moving object 3010 is a cyclist or pedestrian, the system considers the are inside and outside of the drivable area for detecting free space. The drivable area is the area within the boundaries of a roadway. The system identifies a free space 3018 in lane 3002 located between obstacles 3012, 3014, a free space 3016 in an adjacent lane 3004 to the left of obstacle 3014, a free space 3020 to the right side of obstacle 3012, and a free space 3022 to the left of lane 3004. Since the system knows the dimensions of object 3010, it is able to conclude that the identified free spaces 3016, 3018, 3020, 3022 are large enough for the moving object 3010 to fit through. Thus, the system concludes that free space does exist around the obstacles for the moving object to fit. The present solution is not limited to the particulars of FIGS. 29-30.

Referring again to FIG. 4, method 400 continues with 420 when the system does not detect any free space through which the moving object can travel [418:NO]. 420 involves generating a possible object trajectory in which the moving object does not veer around the obstacle(s) and/or comes to a stop (for example, when the obstacle is a queued vehicle in front of the moving object). Next, method 400 continues with 436 which will be discussed below.

Figures 18, 19:
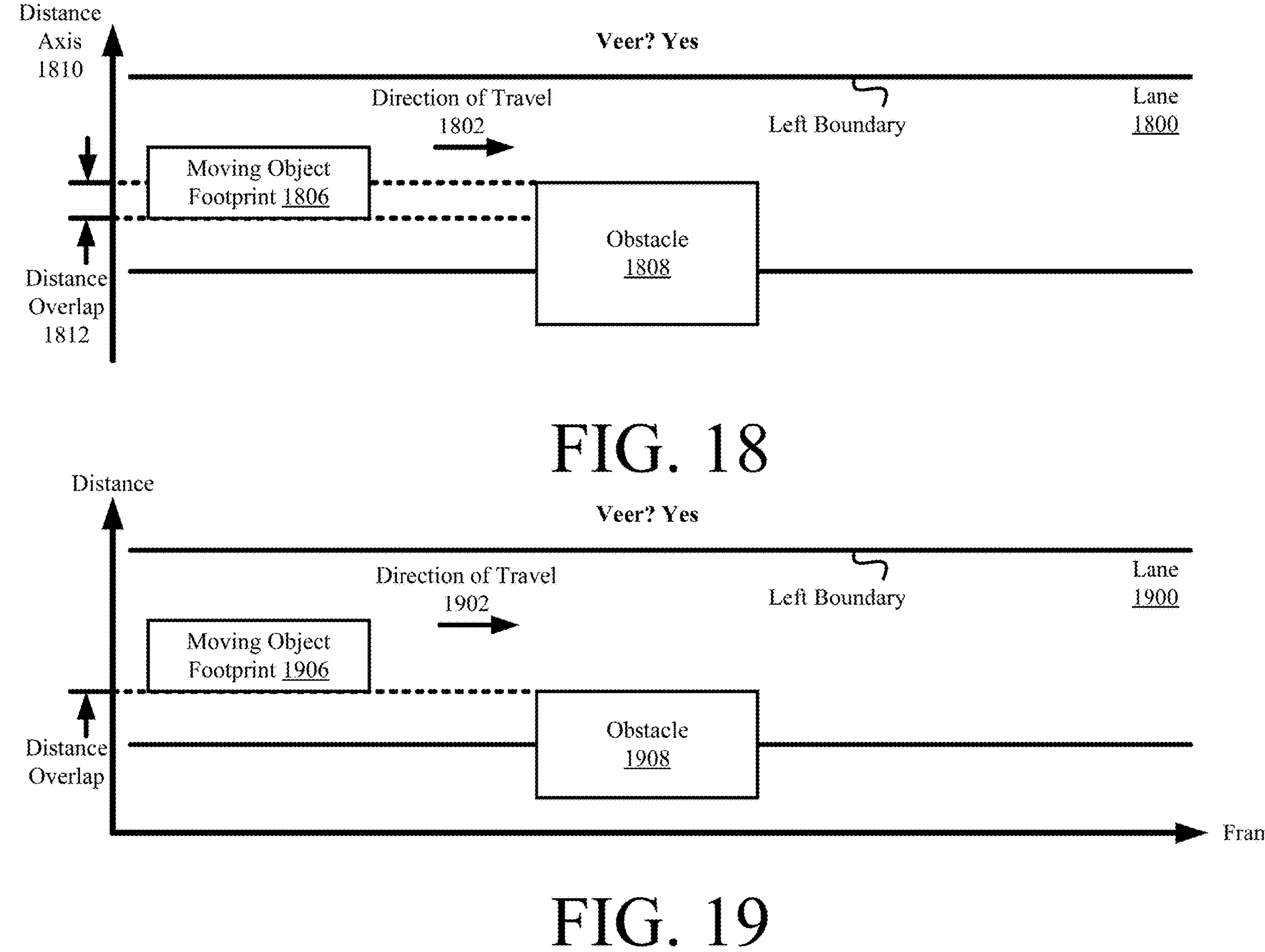
FIGS. 18-21 illustrate scenarios when object veering around an obstacle should or should not be performed.

When the system detects free space through which the moving object can travel [418:YES], method 400 continues with 422 where the system determines whether the moving object should veer around the obstacle(s). Illustrations are provided in FIGS. 18-21 to facilitate an understanding how this determination may be made. In FIG. 18, a moving object is traveling in a lane 1800 with an obstacle 1808. The moving object is moving in a direction 1802 towards the obstacle 1808. The system generates a footprint 1806 for the moving object and uses the same to detect that the moving object and obstacle 1808 overlap with each other relative to the distance axis 1810, i.e., they have a distance overlap 1812. In this case, the system determines that the moving object should veer around the obstacle 1808.

In FIG. 19, a moving object is traveling in a lane 1900 with an obstacle 1908. The moving object is moving in a direction 1902 towards the obstacle 1908. The system generates a footprint 1906 for the moving object and uses the same to detect that the moving object and obstacle 1808 have edges with the same distance value. The system considers the moving object and obstacle as overlapping in this case. Thus, the system determines that the moving object should veer around the obstacle 1908.

Figures 20, 21:
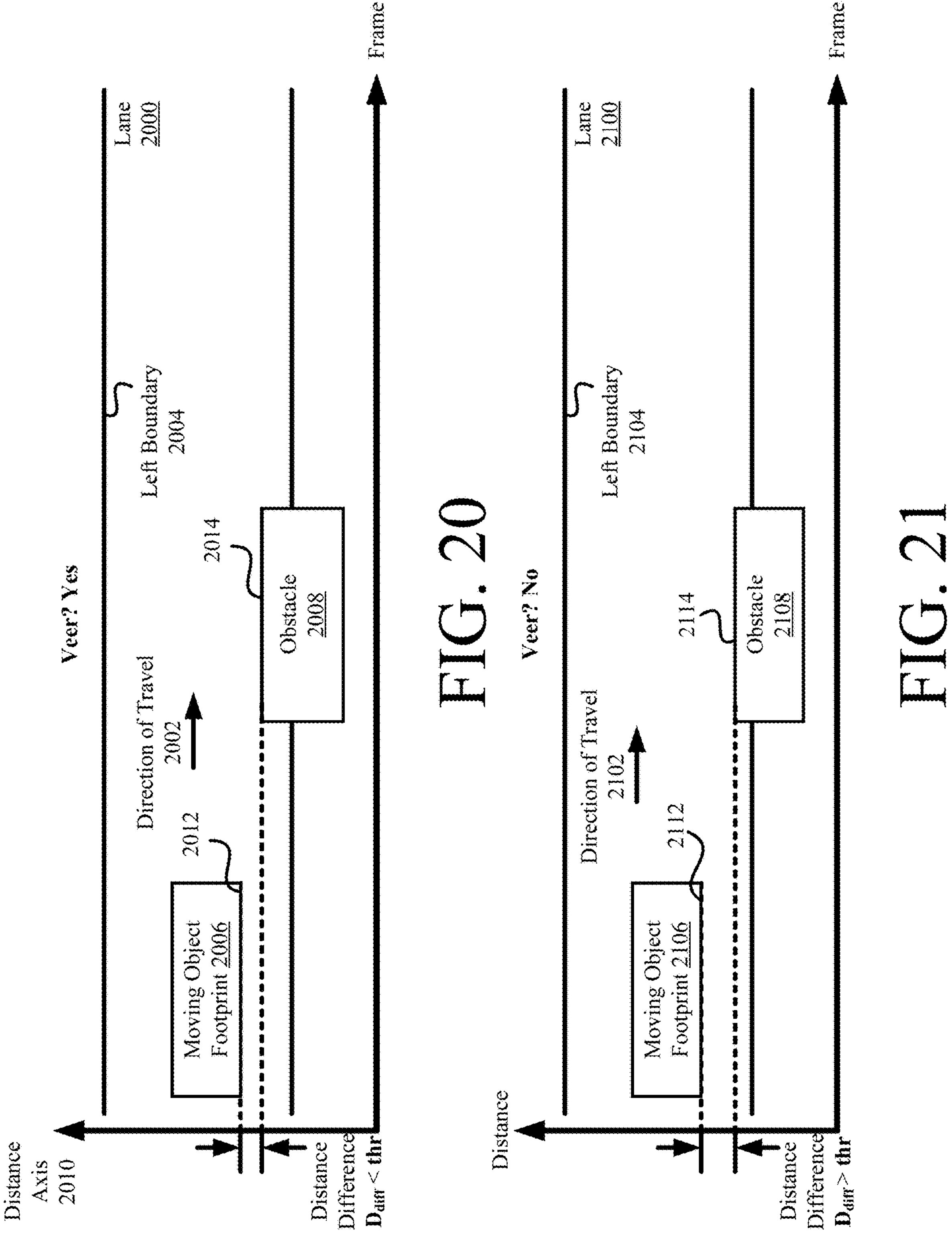

In FIG. 20, a moving object is traveling in a lane 2000 with an obstacle 2008. The moving object is moving in a direction 2002 towards the obstacle 2008. The system generates a footprint 2006 for the moving object and uses the same to detect a difference between a distance from the left boundary 2004 of the lane to a right edge 2012 of the moving object and a difference between a distance from the left boundary 2004 of the lane to a left edge 2014 of the obstacle 2008. The distance difference $D_{diff}$ is compared to a threshold value thr. Since the distance difference is less than the threshold value (i.e., $D_{diff}$<thr), the system considers this scenario as a scenario in which the moving object should veer around the obstacle 2008.

In FIG. 21, a moving object is traveling in a lane 2100 with an obstacle 2108. The moving object is moving in a direction 2102 towards the obstacle 2108. The system generates a footprint 2106 for the moving object and uses the same to detect a difference between a distance from the left boundary 2104 of the lane to a right edge 2112 of the moving object and a difference between a distance from the left boundary 2104 of the lane to a left edge 2114 of the obstacle 2108. The distance difference $D_{diff}$ is compared to a threshold value thr. Since the distance difference is greater than the threshold value (i.e., $D_{diff}$>thr), the system considers this scenario as a scenario in which the moving object should not veer around the obstacle 2108.

Figure 22:
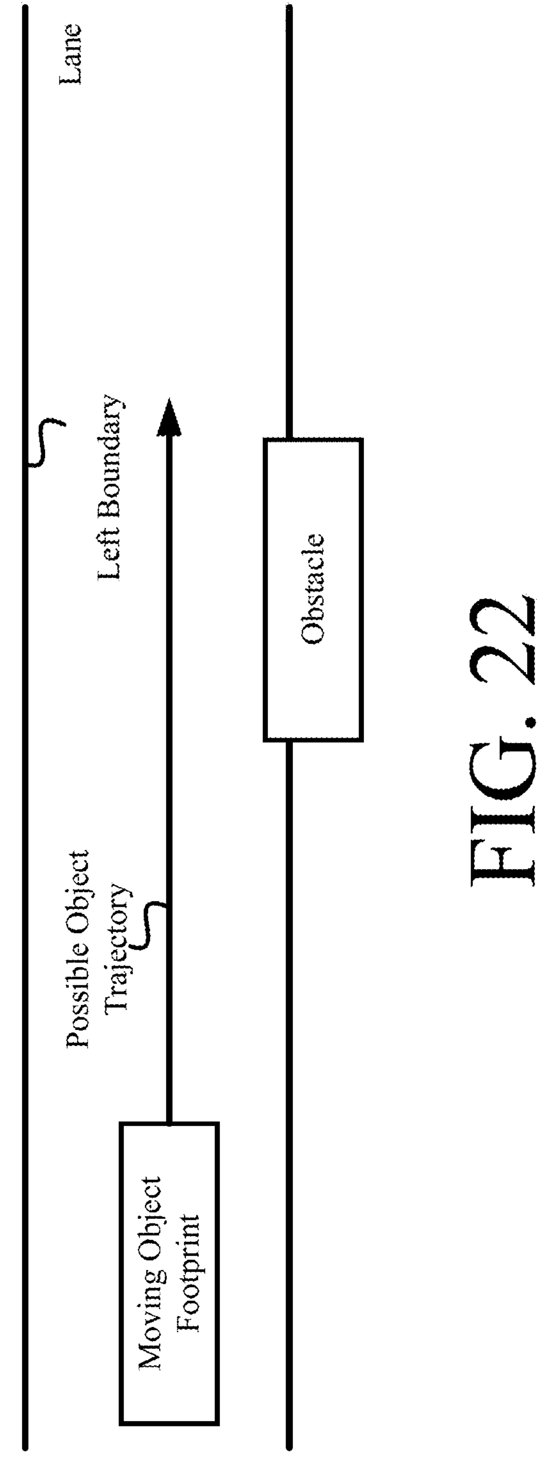
FIG. 22 illustrate a possible object trajectory.

Referring again to FIG. 4, method 400 continues with 424 when the system concludes that the moving object should not veer around the obstacle(s) [422:NO]. In 424, a possible object trajectory is generated in which the moving object does not veer around the obstacle(s). An illustrative object trajectory 2022 of this type is shown in FIG. 22. Once the possible object trajectory has been generated, method continues with 432 which will be discussed below.

In contrast, method 400 continues with 426 when the system concludes that the moving object should veer around the obstacle(s) [422:YES]. In 422, the system determines whether the moving object should veer to the left or right of the obstacle(s). Illustrations are provided in FIGS. 23-26 and 29 which are useful for understanding how this determination is made.

Figures 23, 24:
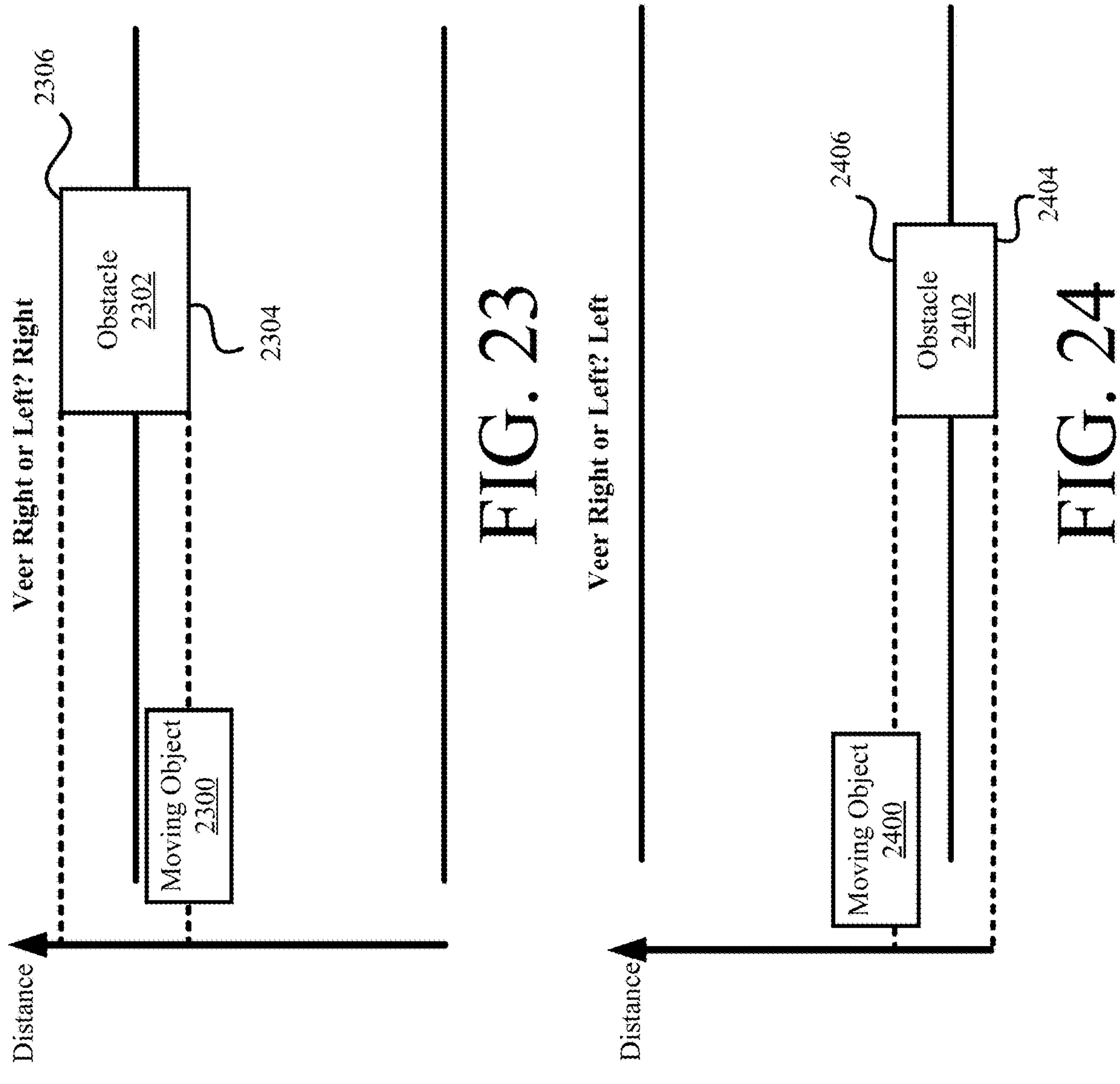
FIGS. 23-26 illustrate when a moving object should veer left or right around an obstacle.

In FIG. 23, the right side 2304 of the obstacle 2302 is closer to the moving object 2300 than the left side 2306 of the obstacle. Thus, the system concludes that the moving object should veer to the right side of the obstacle. The present solution is not limited to the particulars of FIG. 23.

In FIG. 24, the left side 2406 of the obstacle 2402 is closer to the moving object 2400 than the right side 2404 of the obstacle. Thus, the system concludes that the moving object should veer to the left side of the obstacle. The present solution is not limited to the particulars of FIG. 24.

Figures 25, 26:
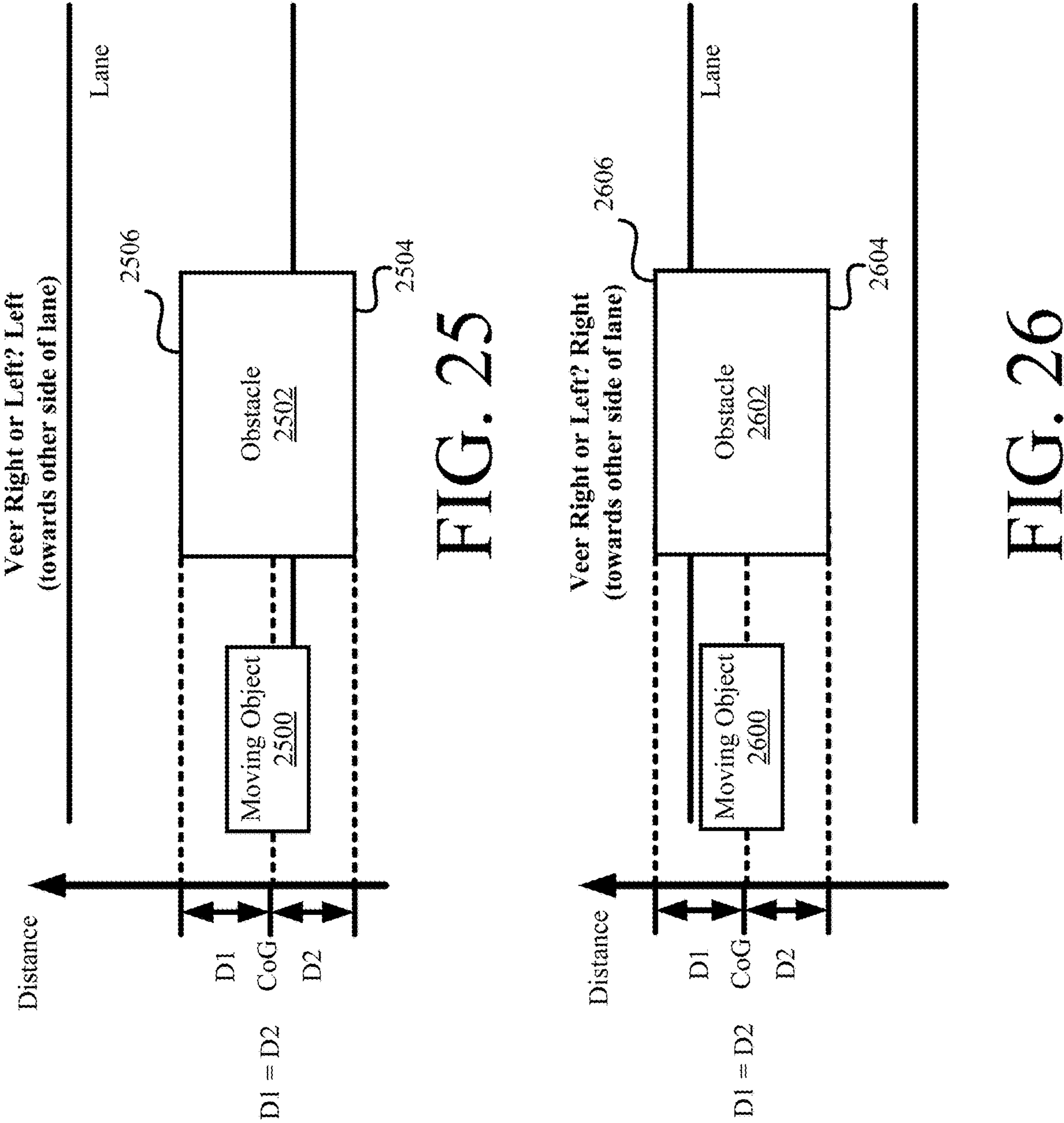

In FIG. 25, a moving object 2500 is traveling on the right side of a lane. The right and left sides 2504, 2506 of the obstacle 2502 are equidistant from a center or center of gravity (CoG) of the moving object 2500. Thus, the system concludes that the moving object should veer around the obstacle and the veering should be towards the other side (i.e., left side) of the lane. In effect, the system determines that the moving object should veer to the left side of the obstacle. The present solution is not limited to the particulars of FIG. 25.

In FIG. 26, a moving object 2600 is traveling on the left side of a lane. The right and left sides 2604, 2606 of the obstacle 2602 are equidistant from a center or CoG of the moving object 2600. Thus, the system concludes that the moving object should veer around the obstacle and the veering should be towards the other side (i.e., right side) of the lane. In effect, the system determines that the moving object should veer to the right side of the obstacle. The present solution is not limited to the particulars of FIG. 26.

In some scenarios, the system may check that its left/right veering direction is through free space. For example, with reference to FIG. 29, the system may determine that the moving object should veer to the right of obstacle 2914 since the right side of obstacle is closer to the moving object than the left side of the obstacle. However, the free space 2918 to the right of the obstacle 2914 is too small for the moving object to fit through. Thus, the system re-considers veering to the left of the obstacle 2914 by the moving object. Since the free space 2916 is large enough for the moving object to travel through, the system concludes that the moving object should veer to the left of the obstacle rather then the right of the obstacle 2914. The present solution is not limited to the particulars of FIG. 29.

Figures 27, 28:
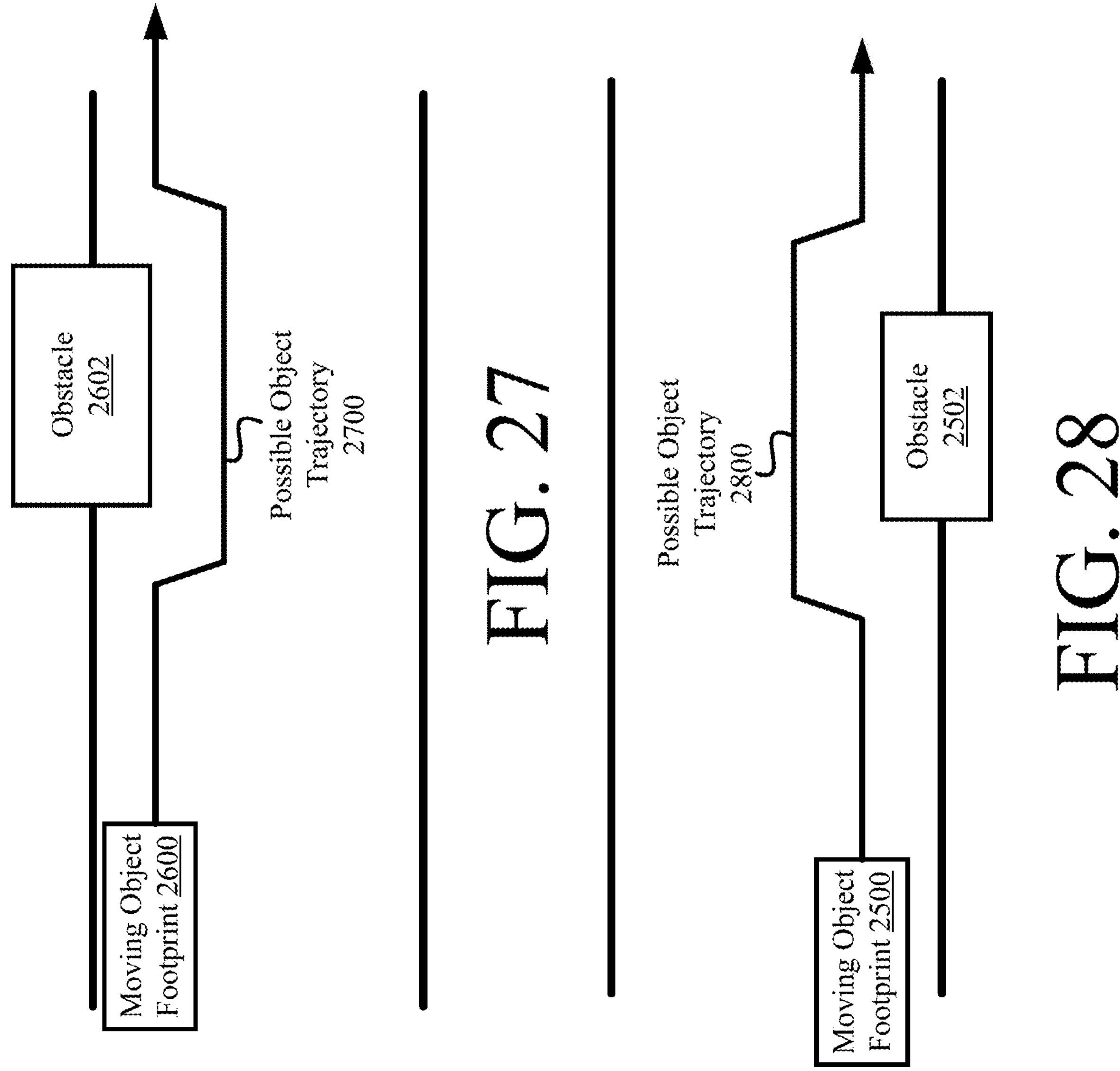
FIG. 27 illustrates a possible object trajectory for veering to the right side of an obstacle.
FIG. 28 illustrates a possible object trajectory for veering to the left side of an obstacle.

Referring again to FIG. 4, method 400 continues with 428 when the system determines that the moving object should veer to the right of the obstacle(s) [426:NO]. 428 involves generating a possible object trajectory in which the moving object veers to the right side of the obstacle(s). An illustrative possible object trajectory 2700 of this type is shown in FIG. 27. In contrast, method 400 continues with 430 when the system determines that the moving object should veer to the left of the obstacle(s) [426:YES]. 430 involves generating a possible object trajectory in which the moving object veers to the left side of the obstacle(s). An illustrative possible object trajectory 2800 of this type is shown in FIG. 28.

Once a possible object trajectory has been generated, operations of optional blocks 432-434 may be performed. 432-434 involve: generating a vehicle trajectory based on the possible object trajectory; and causing the vehicle to follow the vehicle trajectory. Subsequently, method 400 continues to 436 where it ends or other operations are performed (for example, return to 404).

The present solution is not limited to the particulars of the above discussion. The system can define the obstacles in multiple ways. One way to define an obstacle is discussed above. Another way to define an obstacle is: define a set of crosslines (vertical lines) for each lane; define a maximum occupied space for each crossline, where the maximum occupied space starts from the left boundary of the obstacle; and attach a classification of the obstacle type to each of the intervals. At the end, the definition for an obstacle may be: [Lane1]=V1[ ], V2[{1,4—construction}, {5,7—parked car}, . . . , Vn[other intervals]. Next, any overlapping of obstacles is handled. Various embodiments can be implemented, for example, using one or more computer systems, such as computer system 3100 shown in FIG. 31. Computer system 3100 can be any computer capable of performing the functions described in this document.

Computer system 3100 includes one or more processors (also called central processing units, or CPUs), such as a processor 3104. Processor 3104 is connected to a communication infrastructure or bus 3102. Optionally, one or more of the processors 3104 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 3100 also includes user input/output device(s) 3116, such as monitors, keyboards, pointing devices, etc., that communicate with communication infrastructure 3102 through user input/output interface(s) 3108.

Computer system 3100 also includes a main or primary memory 3106, such as random access memory (RAM). Main memory 3106 may include one or more levels of cache. Main memory 3106 has stored therein control logic (i.e., computer software) and/or data.

Computer system 3100 may also include one or more secondary storage devices or memory 3110. Secondary memory 3110 may include, for example, a hard disk drive 3112 and/or a removable storage device or drive 3114. Removable storage drive 3114 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 3114 may interact with a removable storage unit 3118. Removable storage unit 3118 includes a computer usable or readable storage device having stored thereon computer software (control logic) and/or data. Removable storage unit 3118 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 3114 reads from and/or writes to removable storage unit 3118 in a well-known manner.

According to an example embodiment, secondary memory 3110 may include other means, instrumentalities or other approaches for allowing computer programs and/or other instructions and/or data to be accessed by computer system 3100. Such means, instrumentalities or other approaches may include, for example, a removable storage unit 3122 and an interface 3120. Examples of the removable storage unit 3122 and the interface 3120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 3100 may further include a communication or network interface 3124. Communication interface 3124 enables computer system 3100 to communicate and interact with any combination of remote devices, remote networks, remote entities, etc. (individually and collectively referenced by reference number 3128). For example, communication interface 3124 may allow computer system 3100 to communicate with remote devices 3128 over communications path 3126, which may be wired and/or wireless, and which may include any combination of LANs, WANs, the Internet, etc. Control logic and/or data may be transmitted to and from computer system 3100 via communication path 3126.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 3100, main memory 3106, secondary memory 3110, and removable storage units 3118 and 3122, as well as tangible articles of manufacture embodying any combination of the foregoing. Such control logic, when executed by one or more data processing devices (such as computer system 3100), causes such data processing devices to operate as described in this document.

Figure 31:
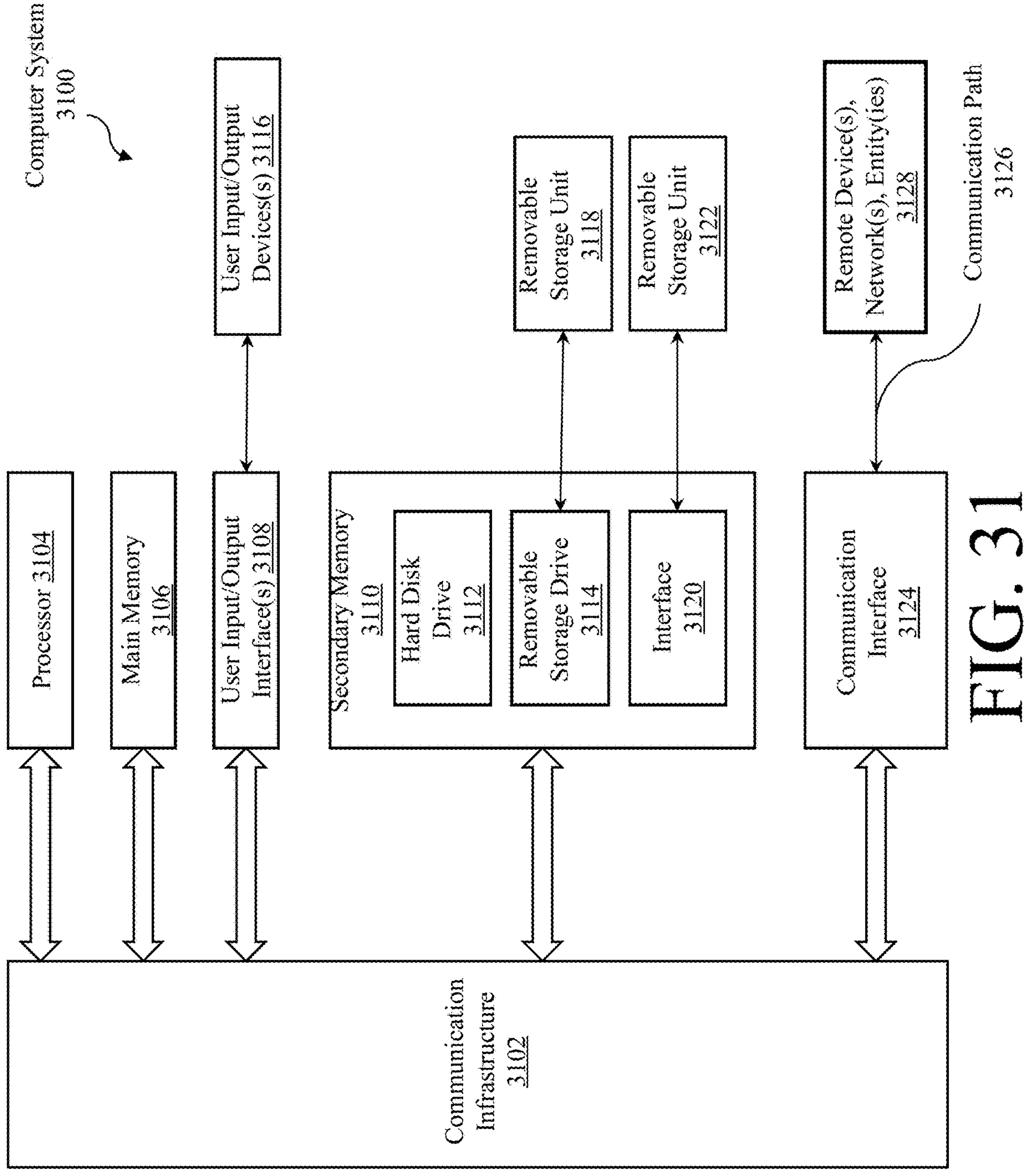
FIG. 31 illustrates a computer system useful for implementing various embodiments.

Based on the teachings contained in this disclosure, it will be apparent to persons skilled in the relevant art(s) how to make and use embodiments of this disclosure using data processing devices, computer systems and/or computer architectures other than that shown in FIG. 31. In particular, embodiments can operate with software, hardware, and/or operating system implementations other than those described in this document.

Terms that are relevant to this disclosure include:

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in in this document.

The features from different embodiments disclosed herein may be freely combined. For example, one or more features from a method embodiment may be combined with any of the system or product embodiments. Similarly, features from a system or product embodiment may be combined with any of the method embodiments herein disclosed.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments but should be defined only in accordance with the following claims and their equivalents.

As described above, this document discloses system, method, and computer program product embodiments for operating a vehicle. The system embodiments include a processor or computing device implementing the methods for operating a vehicle. The computer program embodiments include programming instructions, for example, stored in a memory, to cause a processor to perform the data management methods described in this document. The system embodiments also include a processor which is configured to perform the methods described in this document, for example, via the programming instructions. More generally, the system embodiments include a system comprising means to perform the steps of the any of the methods described in this document.

Without excluding further possible embodiments, certain example embodiments are summarized in the following clauses.

Clause 1. A computer-implemented method for generating a possible object trajectory, comprising: analyzing, by a processor, sensor data to detect a moving object in an environment and at least one obstacle that the moving object is unable to traverse; generating, by the processor, a definition for a location of the obstacle in the environment in terms of reference frames defined for a lane and edge distances from a first boundary (e.g., left boundary) of the lane; using, by the processor, the definition to detect when the moving object should or should not veer around the obstacle; and generating, by the processor, the possible object trajectory based on a detection of when the object should or should not veer around the obstacle.

Clause 2. The computer-implemented method according to Clause 1, further comprising performing operations, by the processor, to control a vehicle based on the possible object trajectory.

Clause 3. The computer-implemented method according to any of the preceding clauses, wherein each said reference frame defines a location in the lane relative to a frame axis extending perpendicular to a distance axis that extends from the first boundary (e.g., left boundary) of the lane to a second boundary (e.g., right boundary) of the lane.

Clause 4. The computer-implemented method according to any of the preceding clauses, wherein the definition is generated by identifying at least one first reference frame that intersects the obstacle and at least one second reference frame which is closest to the obstacle without intersecting the obstacle.

Clause 5. The computer-implemented method according to any of the preceding clauses, wherein the definition is generated by further: obtaining at least one first distance from the first boundary (e.g., left boundary) of the lane to a point on a left edge of the obstacle and at least one second distance from the first boundary (e.g., left boundary) of the lane to a point on a right edge of the obstacle; and arranging an identifier for the at least one first reference frame, an identifier for the at least one second reference frame, the at least one first distance and the at least one second distance to provide the definition.

Clause 6. The computer-implemented method according to any of the preceding clauses, wherein the definition is generated by further: obtaining a first distance from the first boundary (e.g., left boundary) of the lane to a first corner of the obstacle, a second distance from the first boundary (e.g., left boundary) of the lane to a second corner of the obstacle, a third distance from the first boundary (e.g., left boundary) of the lane to a third corner of the obstacle, and a fourth distance from the first boundary (e.g., left boundary) of the lane to a fourth corner of the obstacle; and arranging an identifier of the at least one first reference frame, an identifier of the at least one second reference frame, the first distance, the second distance, the third distance and the fourth distance to provide the definition.

Clause 7. The computer-implemented method according to any of the preceding clauses, wherein the first, second, third and fourth distances are arranged in a clockwise order.

Clause 8. The computer-implemented method according to any of the preceding clauses, wherein the definition is generated by further: obtaining a minimum distance from the first boundary (e.g., left boundary) of the lane to a left side of the obstacle and a maximum distance from the first boundary (e.g., left boundary) of the lane to a right side of the obstacle; and arranging an identifier of the at least one first reference frame, an identifier of the at least one second reference frame, the minimum distance and the maximum distance to provide the definition.

Clause 9. The computer-implemented method according to any of the preceding clauses, wherein the definition is generated using a 2D rectangle encompassing the obstacle and at least one other obstacle in the environment, the obstacle and at least one other obstacle being sequentially arranged in terms of reference frames, associated with two same consecutive reference frames, and overlapped in terms of distance from the first boundary (e.g., left boundary).

Clause 10. The computer-implemented method according to any of the preceding clauses, wherein the edge distances are obtained using a distance axis with an origin aligned with the first boundary (e.g., left boundary) of the lane.

Clause 11. The computer-implemented method according to any of the preceding clauses, wherein the origin of the distance axis has a different location relative to the obstacle for at least two of said reference frames.

Clause 12. The computer-implemented method according to any of the preceding clauses, wherein a classification of the obstacle is used by the processor in addition to the definition to detect when the moving object should or should not veer around the obstacle.

Clause 13. The computer-implemented method according to any of the preceding clauses, wherein a detection is made that the moving object should veer around the obstacle when at least a portion of the moving object and at least a portion of the obstacle are a same distance from the first boundary (e.g., left boundary) of the lane.

Clause 14. The computer-implemented method according to any of the preceding clauses, wherein a detection is made that the moving object should veer around the obstacle when a difference is less than a threshold, the difference being between a distance from the first boundary (e.g., left boundary) of the lane to a side of the moving object that is farthest from the first boundary (e.g., left boundary) and a distance from the first boundary (e.g., left boundary) of the lane to a side of the obstacle that is closest to the first boundary (e.g., left boundary).

Clause 15. The computer-implemented method according to any of the preceding clauses, wherein a detection is made that the moving object should not veer around the obstacle when the difference is greater than the threshold.

Clause 16. The computer-implemented method according to any of the preceding clauses, further comprising building a table in which the definition and a classification of the obstacle are indexed by an identifier for the lane.

Clause 17. The computer-implemented method according to any of the preceding clauses, further comprising using the definition to obtain a veering direction for the moving object.

Clause 18. The computer-implemented method according to any of the preceding clauses, wherein the veering direction is right when a right edge of the obstacle is closer to the moving object than a left edge of the obstacle, and is left when the left edge of the obstacle is closer to the moving object than the right edge of the obstacle.

Clause 19. The computer-implemented method according to any of the preceding clauses, wherein the veering direction is right when left and right edges of the obstacle are equidistant to the moving object and the moving object is located to a left side of the lane, and is left when the left and right edges of the obstacle are equidistant to the moving object and the moving object is located to a right side of the lane.

Clause 20. The computer-implemented method according to any of the preceding clauses, further comprising identifying a free space around the obstacle through which the moving object is able to traverse.

Clause 21. The computer-implemented method according to any of the preceding clauses, further comprising changing the veering direction based on the free space which was identified.

Clause 22. The computer-implemented method according to any of the preceding clauses, wherein the free space resides entirely inside a drivable area when the moving object is classified as a vehicle.

Clause 23. The computer-implemented method according to any of the preceding clauses, wherein the free space resides inside or outside of a drivable area when the moving object is classified as a cyclist or pedestrian.

Clause 24. A computer-implemented method for generating a possible object trajectory, comprising: analyzing, by a processor, sensor data to detect a moving object in an environment and at least one obstacle that the moving object is unable to traverse; generating, by the processor, a definition for a location of the obstacle in the environment in terms of reference frames defined for a lane and distances from a first boundary of the lane to edges of the obstacle; using, by the processor, the definition for the location of the obstacle and known dimensions of the moving object to detect any free space around the obstacle through which the moving object can traverse; generating, by the processor, the possible object trajectory based on the detection of any free space; and/or performing operations, by the processor, to control a vehicle based on the possible object trajectory.

Clause 25. The computer-implemented method according to any of the preceding clauses, wherein the free space resides entirely inside a drivable area within boundaries of a roadway, when the moving object is classified as a vehicle.

Clause 26. The computer-implemented method according to any of the preceding clauses, wherein the free space resides inside or outside of a drivable area within boundaries of a roadway, when the moving object is classified as a cyclist or pedestrian.

Clause 27. The computer-implemented method according to any of the preceding clauses, wherein the possible object trajectory veers the moving object around the obstacle when free space is detected or does not veer the moving object around the obstacle when no free space is detected.

Clause 28. The computer-implemented method according to any of the preceding clauses, wherein each said reference frame defines a 2D space in the lane in terms of a coordinate on a frame axis and coordinates on a distance axis, the frame axis extending perpendicular to the distance axis and the distance axis extending from the left boundary of the lane to a right boundary of the lane.

Clause 29. The computer-implemented method according to any of the preceding clauses, wherein an origin of the distance axis is aligned with the left boundary of the lane and has a variable location on the distance axis when the left boundary of the lane curves or bends.

Clause 30. The computer-implemented method according to any of the preceding clauses, further comprising generating the definition by identifying at least one first reference frame that intersects the obstacle and at least one second reference frame which is closest to the obstacle without intersecting the obstacle.

Clause 31. The computer-implemented method according to any of the preceding clauses, wherein generating the definition further comprises: obtaining at least one first distance from the left boundary of the lane to a point on a left edge of the obstacle and at least one second distance from the left boundary of the lane to a point on a right edge of the obstacle; and arranging an identifier for the at least one first reference frame, an identifier for the at least one second reference frame, the at least one first distance and the at least one second distance to provide the definition.

Clause 32. The computer-implemented method according to any of the preceding clauses, wherein generating the definition further comprises: obtaining a first distance from the left boundary of the lane to a first corner of the obstacle, a second distance from the left boundary of the lane to a second corner of the obstacle, a third distance from the left boundary of the lane to a third corner of the obstacle, and a fourth distance from the left boundary of the lane to a fourth corner of the obstacle; and arranging an identifier of the at least one first reference frame, an identifier of the at least one second reference frame, the first distance, the second distance, the third distance and the fourth distance to provide the definition.

Clause 33. The computer-implemented method according to any of the preceding clauses, wherein generating the definition further comprises: obtaining a minimum distance from the left boundary of the lane to a left side of the obstacle and a maximum distance from the left boundary of the lane to a right side of the obstacle; and arranging an identifier of the at least one first reference frame, an identifier of the at least one second reference frame, the minimum distance and the maximum distance to provide the definition.

Clause 34. The computer-implemented method according to any of the preceding clauses, wherein generating the definition comprises using a 2D rectangle encompassing the obstacle and at least one other obstacle in the environment, the obstacle and at least one other obstacle being sequentially arranged in terms of reference frames, associated with two same consecutive reference frames, and overlapped in terms of distance from the left boundary.

Clause 35. A system comprising means for performing steps of any of the above method clauses.

Clause 36. A computer program, or a storage medium storing the computer program, comprising instructions, which when executed by one or more suitable processors cause any of the processors to perform the steps of any of the above method clauses.

What is claimed is:

1. A method for a vehicle, comprising:

analyzing, by a processor of the vehicle, sensor data to detect a moving object in an environment and at least one obstacle that the moving object is unable to traverse;

generating, by the processor, a definition for a location of the obstacle in the environment in terms of reference frames defined for a lane and distances from a left boundary of the lane to edges of the obstacle;

using, by the processor, the definition for the location of the obstacle and known dimensions of the moving object to detect any free space around the obstacle through which the moving object can traverse;

generating, by the processor, a possible object trajectory based on the detection of any free space;

generating, by the processor, a vehicle trajectory based on the object trajectory; and performing operations, by the processor, to control the vehicle to follow the vehicle trajectory.

2. The method according to claim 1, further comprising performing operations, by the processor, to control the vehicle based on the possible object trajectory.

3. The method according to claim 1, wherein the free space resides entirely inside a drivable area within boundaries of a roadway, when the moving object is classified as a moving vehicle.

4. The method according to claim 1, wherein the free space resides inside or outside of a drivable area within boundaries of a roadway, when the moving object is classified as a cyclist or pedestrian.

5. The method according to claim 1, wherein the possible object trajectory veers the moving object around the obstacle when free space is detected or does not veer the moving object around the obstacle when no free space is detected.

6. The method according to claim 1, wherein each said reference frame defines a 2D space in the lane in terms of a coordinate on a frame axis and coordinates on a distance axis, the frame axis extending perpendicular to the distance axis and the distance axis extending from the left boundary of the lane to a right boundary of the lane.

7. The method according to claim 6, wherein an origin of the distance axis is aligned with the left boundary of the lane and has a variable location on the distance axis when the left boundary of the lane curves or bends.

8. The method according to claim 1, further comprising generating the definition by identifying at least one first reference frame that intersects the obstacle and at least one second reference frame which is closest to the obstacle without intersecting the obstacle.

9. The method according to claim 8, wherein generating the definition further comprises: obtaining at least one first distance from the left boundary of the lane to a point on a left edge of the obstacle and at least one second distance from the left boundary of the lane to a point on a right edge of the obstacle; and arranging an identifier for the at least one first reference frame, an identifier for the at least one second reference frame, the at least one first distance and the at least one second distance to provide the definition.

10. The method according to claim 8, wherein generating the definition further comprises: obtaining a first distance from the left boundary of the lane to a first corner of the obstacle, a second distance from the left boundary of the lane to a second corner of the obstacle, a third distance from the left boundary of the lane to a third corner of the obstacle, and a fourth distance from the left boundary of the lane to a fourth corner of the obstacle; and arranging an identifier of the at least one first reference frame, an identifier of the at least one second reference frame, the first distance, the second distance, the third distance and the fourth distance to provide the definition.

11. The method according to claim 8, wherein generating the definition further comprises: obtaining a minimum distance from the left boundary of the lane to a left side of the obstacle and a maximum distance from the left boundary of the lane to a right side of the obstacle; and arranging an identifier of the at least one first reference frame, an identifier of the at least one second reference frame, the minimum distance and the maximum distance to provide the definition.

12. The method according to claim 1, wherein generating the definition comprises using a 2D rectangle encompassing the obstacle and at least one other obstacle in the environment, the obstacle and at least one other obstacle being sequentially arranged in terms of reference frames, associated with two same consecutive reference frames, and overlapped in terms of distance from the left boundary.

13. A system, comprising: a memory; and at least one processor coupled to the memory and configured to:

analyze sensor data to detect a moving object in an environment and at least one obstacle that the moving object is unable to traverse;

generate a definition for a location of the obstacle in the environment in terms of reference frames defined for a lane and distances from a left boundary of the lane to edges of the obstacle;

use the definition for the location of the obstacle and known dimensions of the moving object to detect any free space around the obstacle through which the moving object can traverse;

generate the possible object trajectory based on the detection of any free space;

generate a vehicle trajectory for a vehicle based on the object trajectory; and perform operations to control the vehicle to follow the vehicle trajectory.

14. The system according to claim 13, wherein the free space resides (i) entirely inside a drivable area when the moving object is classified as a moving vehicle, or (i) inside or outside of a drivable area when the moving object is classified as a cyclist or pedestrian, the drivable area being within the boundaries of the roadway.

15. The system according to claim 13, wherein the possible object trajectory veers the moving object around the obstacle when free space is detected or does not veer the moving object around the obstacle when no free space is detected.

16. The system according to claim 13, wherein each said reference frame defines a 2D space in the lane in terms of a coordinate on a frame axis and coordinates on a distance axis, the frame axis extending perpendicular to the distance axis and the distance axis extending from the left boundary of the lane to a right boundary of the lane.

17. The system according to claim 16, wherein an origin of the distance axis is aligned with the left boundary of the lane and has a variable location on the distance axis when the left boundary of the lane curves or bends.

18. The system according to claim 13, wherein the at least one processor is further configured to generate the definition by identifying at least one first reference frame that intersects the obstacle and at least one second reference frame which is closest to the obstacle without intersecting the obstacle.

19. The system according to claim 13, wherein the definition is generated using a 2D rectangle encompassing the obstacle and at least one other obstacle in the environment, the obstacle and at least one other obstacle being sequentially arranged in terms of reference frames, associated with two same consecutive reference frames, and overlapped in terms of distance from the left boundary.

20. A non-transitory computer-readable medium that stores instructions that is configured to, when executed by at least one computing device, cause the at least one computing device to perform operations comprising:

analyzing sensor data to detect a moving object in an environment and at least one obstacle that the moving object is unable to traverse;

generating a definition for a location of the obstacle in the environment in terms of reference frames defined for a lane and distances from a left boundary of the lane to edges of the obstacle;

using the definition for the location of the obstacle and known dimensions of the moving object to detect any free space around the obstacle through which the moving object can traverse;

generating the possible object trajectory based on the detection of any free space;

generating a vehicle trajectory for a vehicle based on the object trajectory; and performing operations to control the vehicle to follow the vehicle trajectory.

* * * * *